United States Patent [19]
Marshall et al.

[11] Patent Number: 5,833,332
[45] Date of Patent: Nov. 10, 1998

[54] FRAME SYSTEM FOR POWER AND SIGNAL CABLE MANAGEMENT

[75] Inventors: Dale R. Marshall; Rod Vallas, both of Calgary; Henry Roemer, Okotoks; Paul Then; Ken Frederick, both of Calgary, all of Canada

[73] Assignee: Smed Manufacturing Inc., Alberta, Canada

[21] Appl. No.: 579,977

[22] Filed: Dec. 28, 1995

Related U.S. Application Data

[63] Continuation-in-part of Ser. No. 139,691, Oct. 22, 1993.

[51] Int. Cl.⁶ .................................................. A47B 81/00
[52] U.S. Cl. ................................. 312/223.3; 312/223.6; 312/265.6; 52/71; 52/36.1; 403/245
[58] Field of Search ............................. 312/223.6, 223.3, 312/257.1, 265.5, 265.6; 403/231, 245; 52/71, 36.1; 220/337, 338, 340

[56] References Cited

U.S. PATENT DOCUMENTS

| | | | |
|---|---|---|---|
| 4,323,291 | 4/1982 | Ball | 312/223.6 X |
| 4,422,385 | 12/1983 | Rutsche et al. | 312/257.1 X |
| 5,129,835 | 7/1992 | DeFouw et al. | 439/215 |
| 5,144,896 | 9/1992 | Fortsch | 312/223.6 X |
| 5,152,698 | 10/1992 | Juhlin et al. | 439/215 |
| 5,160,188 | 11/1992 | Rorke et al. | 312/223.6 X |
| 5,186,425 | 2/1993 | Keusch et al. | 312/223.6 X |
| 5,339,576 | 8/1994 | Fussler | 52/71 |
| 5,403,109 | 4/1995 | Johnson et al. | 403/245 X |
| 5,481,842 | 1/1996 | Gautreau | 403/231 X |
| 5,536,079 | 7/1996 | Kostic | 312/265.5 X |
| 5,537,795 | 7/1996 | Dias | 52/36.1 X |
| 5,673,632 | 10/1997 | Sykes | 312/223.6 X |

FOREIGN PATENT DOCUMENTS

| | | | |
|---|---|---|---|
| 1207369 | 7/1986 | Canada. | |
| 462920 | 12/1991 | European Pat. Off. | 312/223.6 |
| 563850 | 3/1993 | European Pat. Off. | 312/223.3 |
| 555222 | 3/1943 | United Kingdom | 220/337 |
| 2144196 | 2/1985 | United Kingdom | 403/231 |
| 86/01698 | 3/1986 | WIPO | 312/257.1 |

OTHER PUBLICATIONS

"Race Planning Guide", Haworth, Inc., pp. 1–57, 1991.

*Primary Examiner*—Peter R. Brown
*Assistant Examiner*—David E. Allred
*Attorney, Agent, or Firm*—Kerkam, Stowell, Kondracki & Clarke, P.C.; John C. Kerins

[57] ABSTRACT

The invention relates to a novel furniture frame system comprising horizontal and vertical frame members which can be arranged in a variety of configurations to provide at least one continuous concealed channel for cables such as power and/or signal cables, in which the channel is easily accessible for wiring, maintenance, rearrangement and storage of cable without disassembly of the frame system and provides for access to cable outlets at work surface height so that cable devices can be connected to an outlet with minimal interference to the work surface. The frame system itself does not interfere with the work surface. The horizontal frame member has an opening on the top surface which is at work surface height for access to the cable channel, and also has a cover for the opening which has at least one flexible edge to enable cables to pass in and out of the channel when the cover is closed and permits the cable to move freely along the length of the cover.

20 Claims, 21 Drawing Sheets

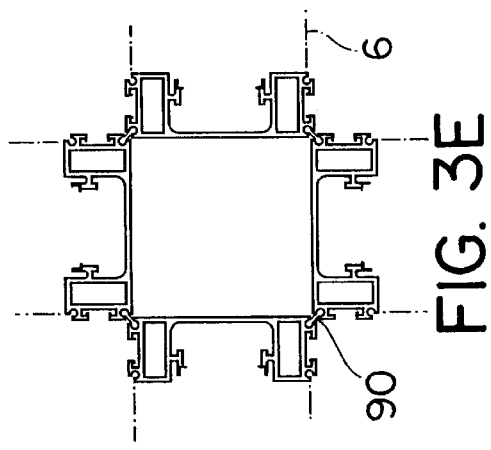
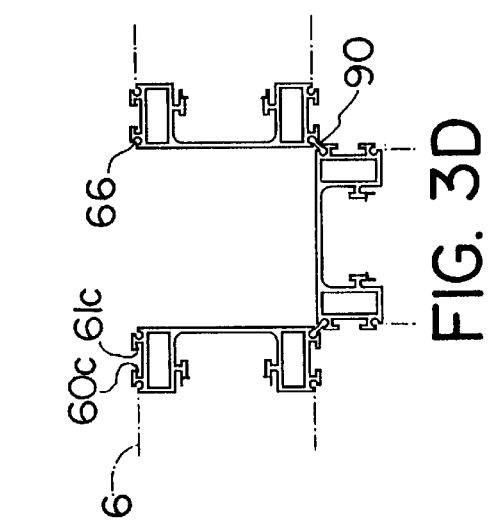
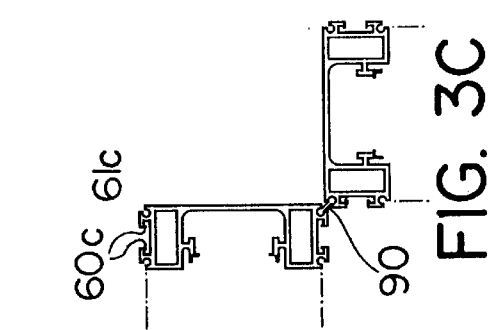
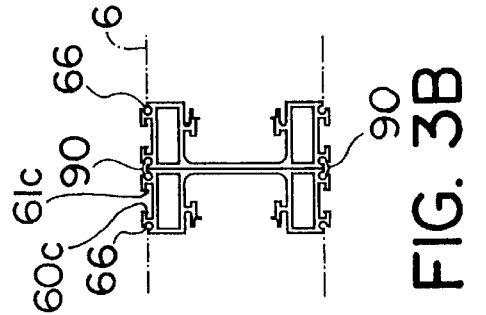
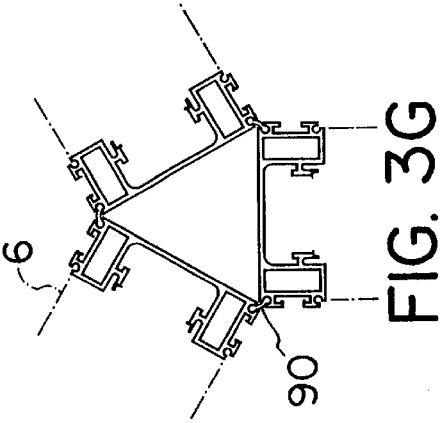
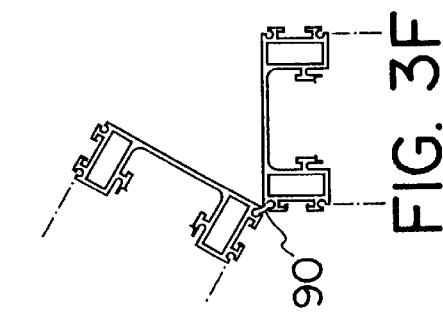
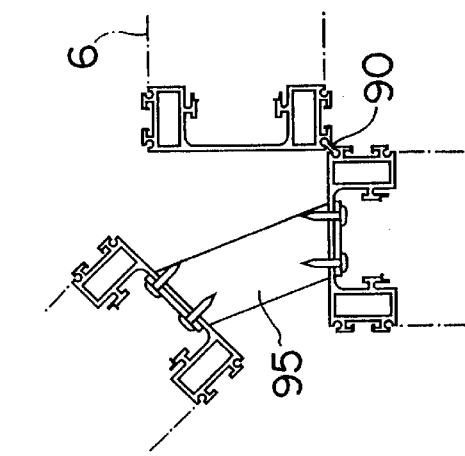
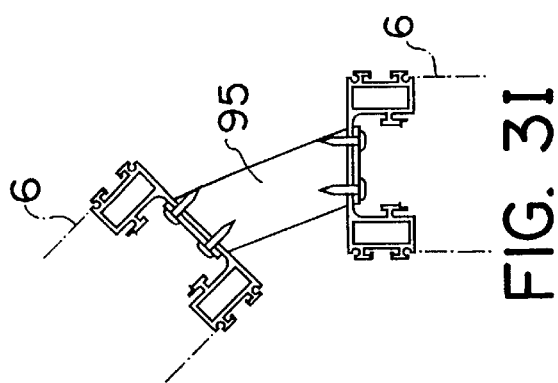

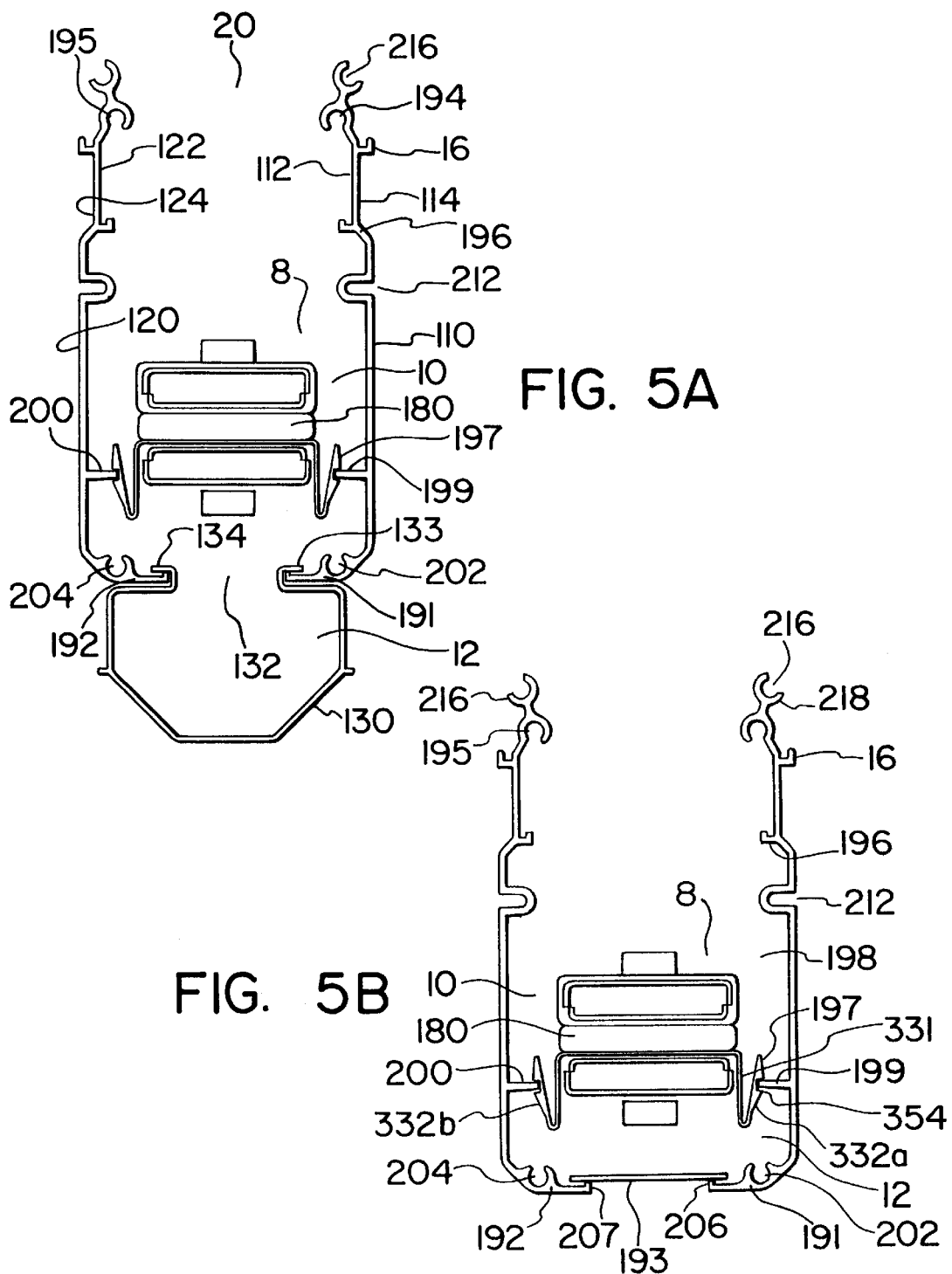

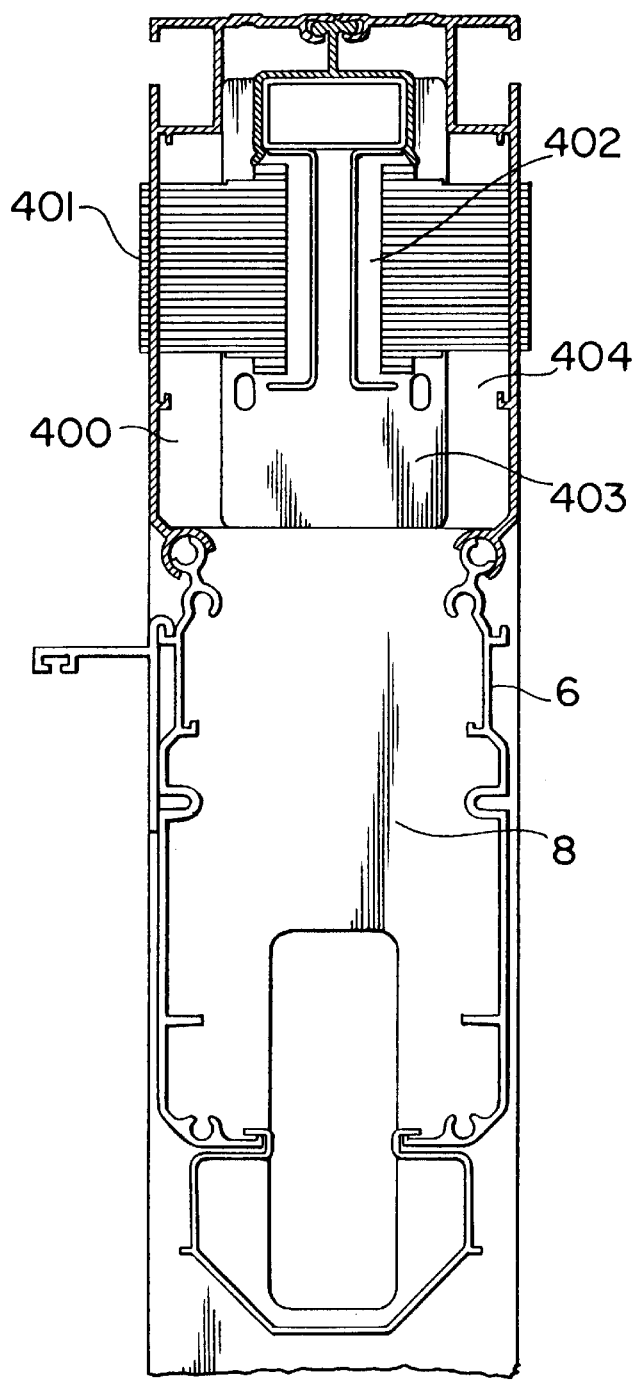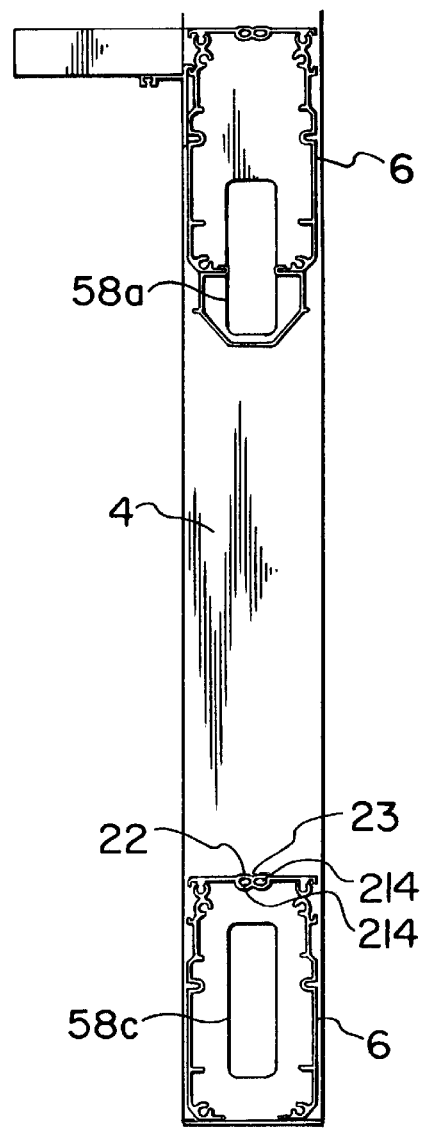
FIG. 5C
FIG. 5D

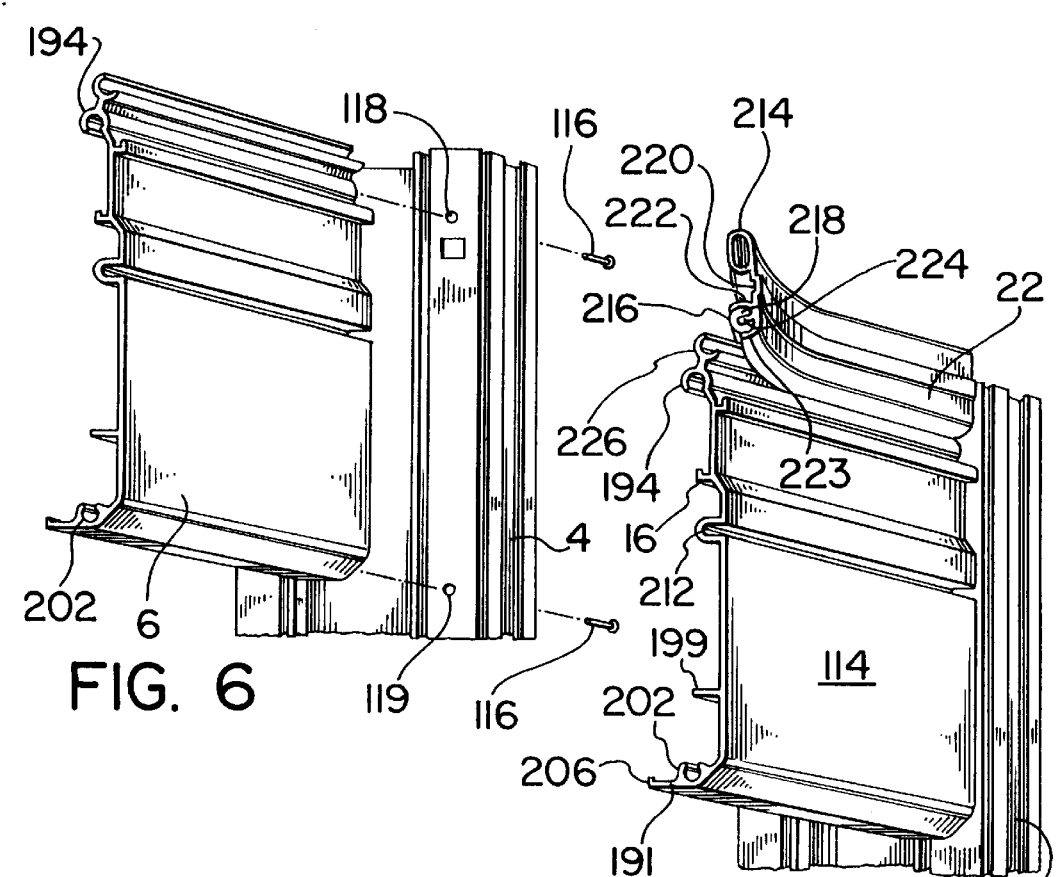
FIG. 6
FIG. 7
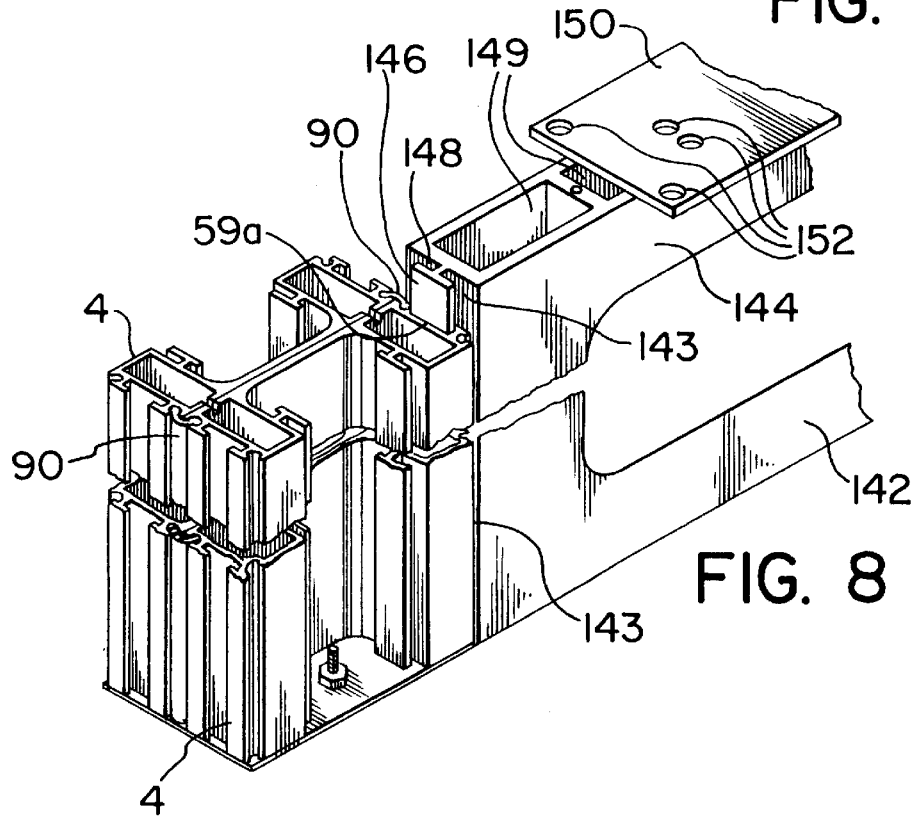
FIG. 8

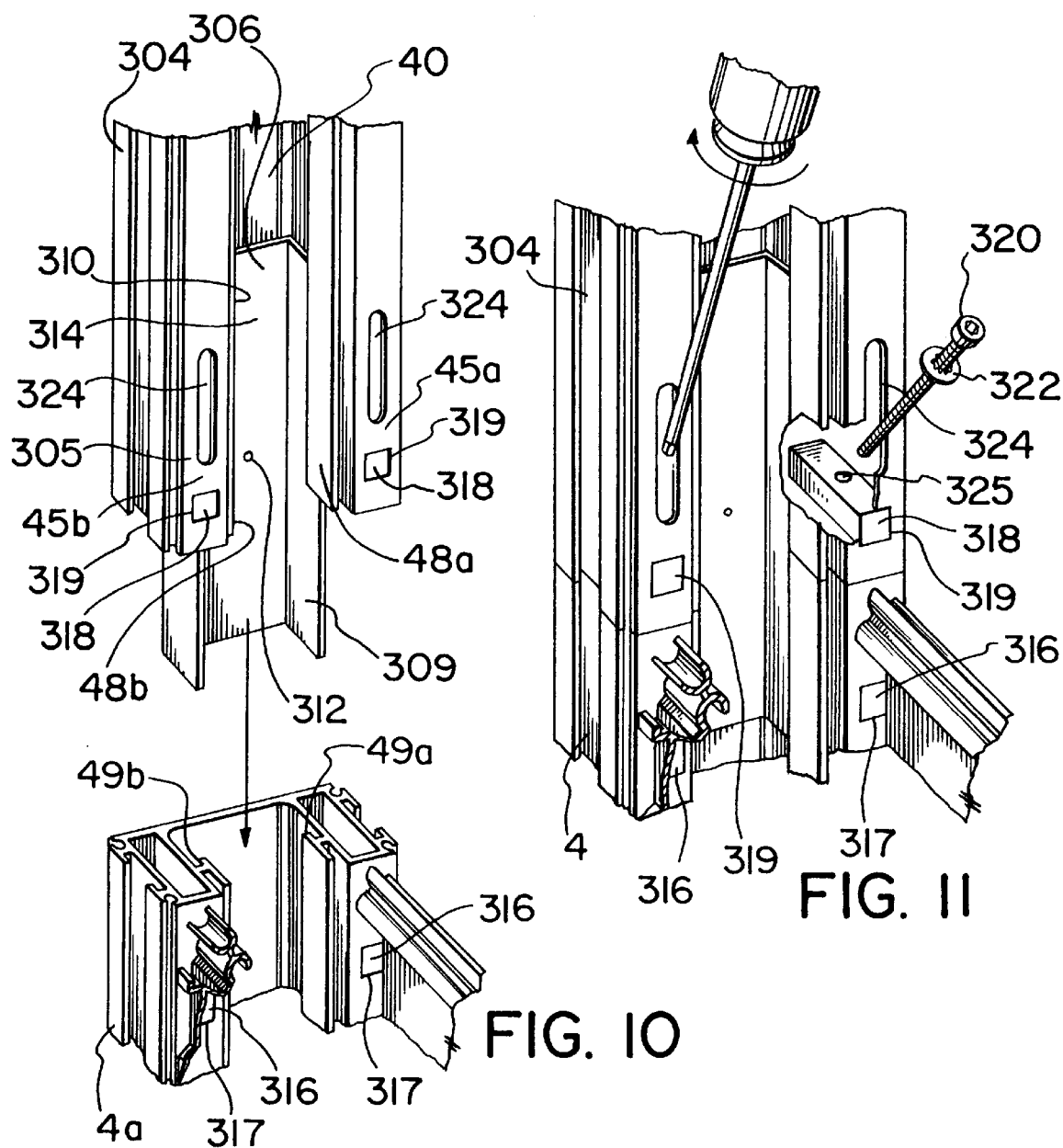

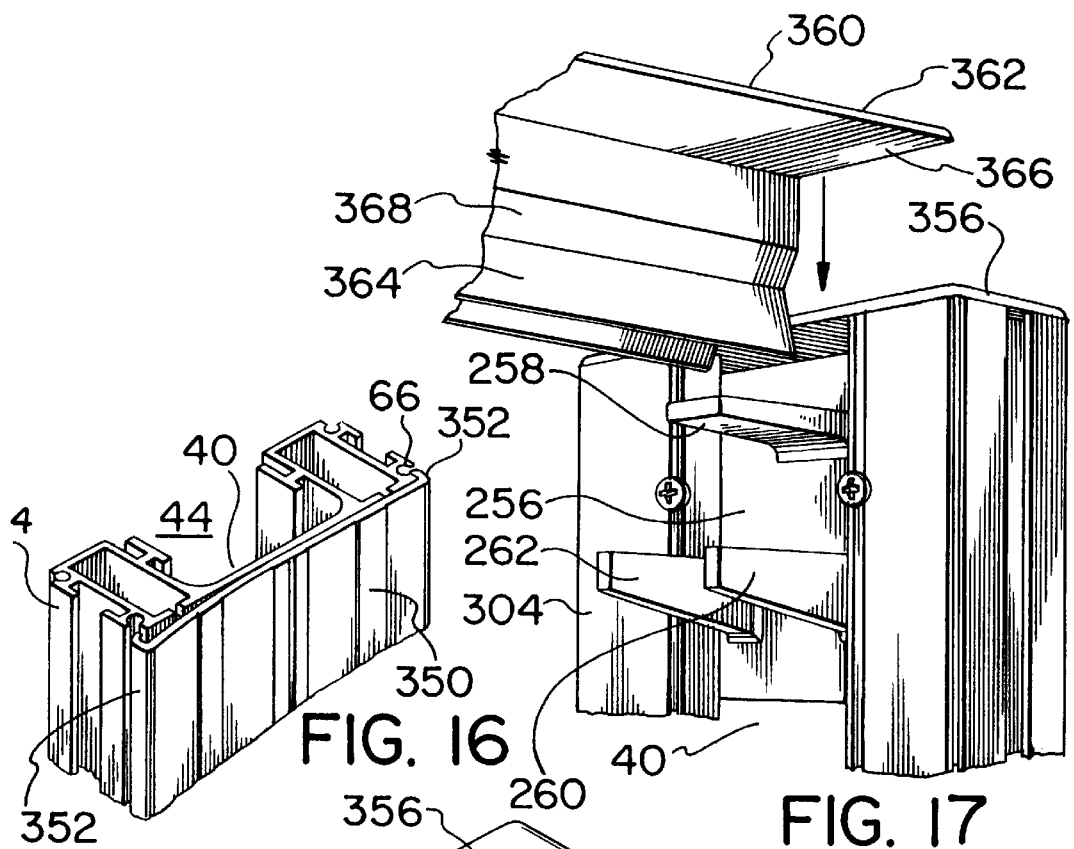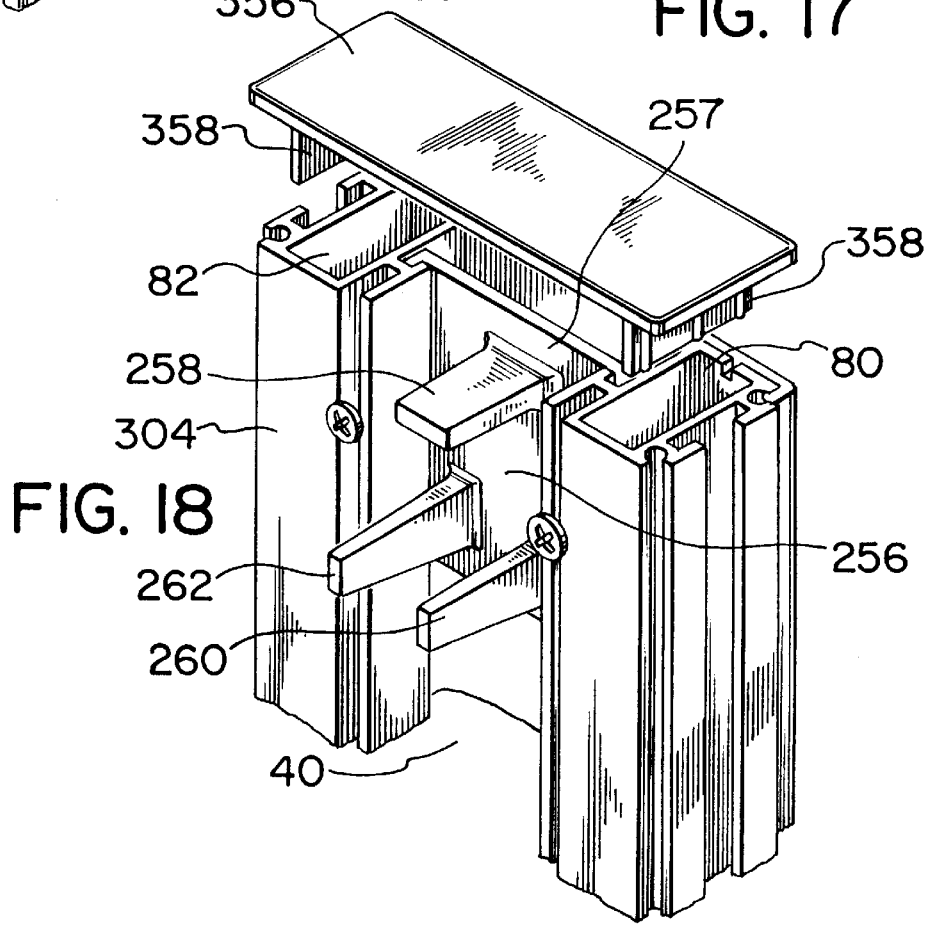

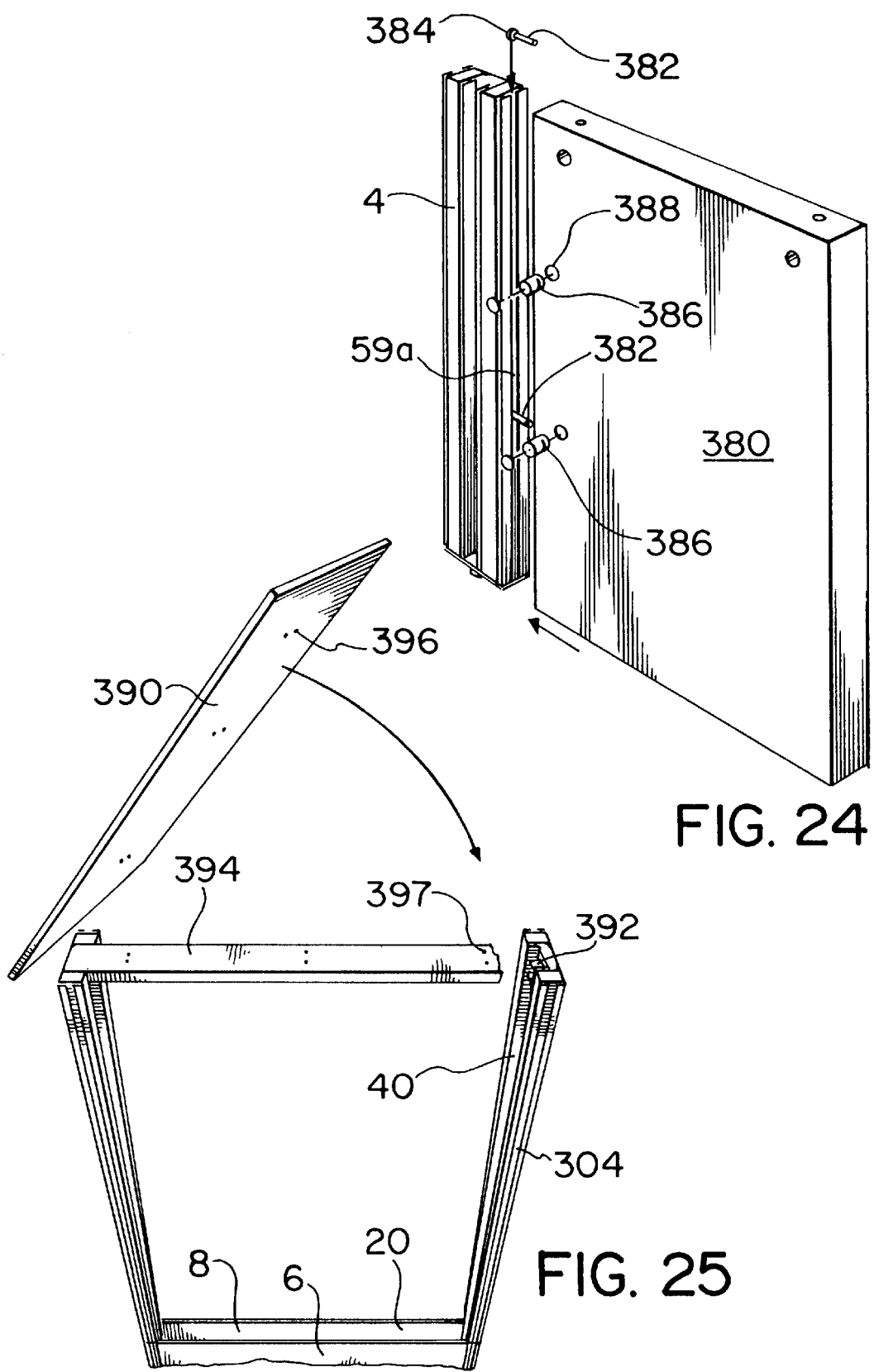

FRAME SYSTEM FOR POWER AND SIGNAL CABLE MANAGEMENT

CROSS REFERENCE TO RELATED APPLICATION

This application is a continuation-in-part of U.S. application Ser. No. 08/139,691, filed Oct. 22, 1993, the subject matter of which is incorporated herein by reference.

FIELD OF THE INVENTION

The invention relates to a novel furniture frame system comprising horizontal and vertical frame members which can be arranged in a variety of configurations to provide at least one continuous concealed channel for cables such as power and/or signal cables. The channel is easily accessible for wiring, maintenance, rearrangement and storage of cable without disassembly of the frame system and provides for access to cable outlets at work surface height so that cable devices can be connected to an outlet with minimal interference to the work surface. The frame system itself does not interfere with the work surface.

BACKGROUND OF THE INVENTION

In the present day office environment with electronic technology as it is, a work surface may support, for example, a telephone, a computer, a hard drive, a monitor, a keyboard, a printer, an electronic calculator, a dictation machine, a radio and a lamp which clutter the work area. The problem of managing cables on the work surface, and below and above it, is ever increasing.

Furthermore, the needs of an office often change, requiring for instance: the replacement of one type of furniture component with another type of furniture component for instance a work surface component with a cabinet component; the reconfiguration of a floor plan; and /or the reconfiguration, maintenance, storage and wiring of a cable system.

Manufacturers have provided continuous channels for cable management in office environments. U.S. Pat. No. 5,152,698 to Juhlin et al. issued Oct. 6, 1992, describes a cable management system at floor level, wherein furniture components are fitted on top of a cable raceway which outlines a floor plan. The raceways are concealed, continuous channels, containing cables and cable outlets. Cable devices can be plugged into the outlets or receptacles at floor level, and fed through vertical frame members. They can then be run horizontally through horizontal frame members, secured beneath the work surface. Juhlin's system has many disadvantages. First, furniture components have to be specifically designed to fit on top of the floor raceway. Second, the raceway is not integrated into the defining and supporting structure of the furniture components, thus horizontal and vertical frame members interfere with space underneath the work surface. Third, one cannot access cable or cable outlets directly from the work surface. Furthermore, Juhlin's system does not provide for continuous cable wiring at, or above work surface height, and reconfiguration of the floor plan requires disassembly of the system.

U.S. Pat. No. 5,160,188 to Rorke, issued Nov. 3, 1992, provides for a furniture frame system having a continuous vertical and horizontal channel for cables. From the work surface, cable outlets or receptacles are only accessible from two stanchions, located at the corner of the work surface. The stanchions interfere with the work surface and limit the configuration of cable devices on the work surface. No provision is made for the storage of excess cable from devices located on the work surface. Devices located centrally on the work surface would result in cable interfering with work space in an aesthetically unpleasing manner. Last, the work stations are bulky, and the furniture frame system, including the cables, is not easily reconfigured without disassembly of the system.

Furniture Manufacturers have developed cable management systems which are accessible from the work surface through a continuous channel system (U.S. Pat. No. 4,224,769 to Ball et al, issued Sep. 30, 1980). To date, cost effective, easy to assemble and reconfigurable systems, with integrated cable and wire management from the floor to the ceiling have not been developed. Furniture cable management systems existing in the prior art intrude upon the work surface. Many of these systems require the user to access cable outlets from underneath the work surface, require repositioning of devices on the work surface to access the cable system; or require tools in order to access the cable system.

To ensure successful organization of the working environment, there is a need for a furniture system which can overcome the above-noted limitations. There is a need for a furniture frame system which can be easily reconfigured and maintained both in terms of the arrangement of the furniture components and in terms of cable management. Furthermore, there is a need to accomplish these objectives in an aesthetically pleasing and cost effective manner. A system which accomplishes these objectives is commercially important.

SUMMARY OF THE INVENTION

The present invention provides a frame system for furniture that is cost effective, easy to assemble and can be originally configured and then reconfigured according to available space and work area needs. The frame system also provides cable management in concealed channels or troughs for housing power and/or signal cables in vertical frame members or legs and upper leg extensions, and horizontal frame members at, above, below, and at work surface height. A power harness may be factory installed, and electrical skill required to assemble the system is minimal. The electrical installation required for the frame system is tool-less, and is easy to maintain and repair. If desired, an upper frame to which panels, shelves, storage units and other accessories may be mounted is supported by vertical legs which attach to the legs of the lower frame by a drop-in and secured connection. The frame system provides a non-generational product that integrates with many of the same components as are presently in use with existing modular furniture systems and modular panel systems. Furthermore, the horizontal frame member and vertical frame system does not intrude into the work surface.

The vertical support structure of the invention provides an alternative to conventional panel based vertical structures, while maintaining design criteria for cable and wire management.

It should be noted that reference to cable in the specification is intended to include power cable and signal cable, more particularly, it can include electrical wiring or power wiring, and communication or signal cables, but is not intended to be limited thereto.

It should also be noted that reference to work surface height is known to those skilled in the art and is known as the height at which a work surface such as a desk is placed. It is generally between 29" to 30", but this invention is not intended to be limited thereto as the height of the work surface can be adapted to the particular height and needs of the user.

In one embodiment, this invention provides a furniture frame system adapted for supporting a work surface comprising:

(a) at least one horizontal frame member having a first and second end and a top and bottom surface; and (b) at least one vertical frame member having an upper end and a lower end, wherein each frame member has at least one concealed channel for cable and cable outlets, preferably power and signal cable outlets, extending throughout its entire length, the channel being defined by walls with ports for ingress and egress of cables, wherein at least one horizontal frame member abuts, at least one vertical frame member at work surface height providing a continuous channel, the abutment being selected from the group of abutments consisting of: port to port; end to port, port to end; and end to end; and wherein the horizontal frame member has a central longitudinal opening in its top surface, the opening extending substantially the length of the channel and cover means therefor, which can be opened and closed without use of tools, the opening providing access at work surface height to substantially the entire channel, the cover means having at least one flexible edge thereby permitting cable to pass in and out of the opening in the cover and freely move along the length of the cover, and excess cable can be stored and concealed in the channel.

In a further embodiment of the invention the horizontal frame member has a main cable channel and an associated secondary cable channel, wherein the secondary cable channel is located below the main cable channel, and wherein the secondary cable channel is detachably secured to the horizontal frame member for rapid installation and deinstallation, the secondary cable channel abutting at least one vertical frame member in such a manner as to provide a continuous cable channel therethrough.

In one embodiment of the invention the secondary channel can be detachably secured to or removed from the horizontal frame member by snap-in attachment means which mate with corresponding snap-in receiving means of the horizontal frame member.

In another embodiment of the invention the horizontal frame member has an opening in its bottom surface extending along the length of the main channel, the opening defined by inwardly projecting walls and wherein the secondary cable channel is defined by a continuous wall, an opening, and L-shaped flanges on opposite sides of the opening, the flanges engaging the inwardly projecting walls of the horizontal frame member, to hang the secondary cable channel below the horizontal frame member, the secondary channel being made of resilient material so that when pressure is applied to the sides of the channel along the continuous wall, the flanges release and allow the secondary cable channel to be detached to provide access to both the main channel and the secondary channel and/or removal of the secondary channel.

In a preferred embodiment of the invention the top surface of the horizontal frame member is flush with the work surface.

Referring now to the cover of the opening in the top surface of the horizontal frame member in a preferred embodiment the cover has a central longitudinal opening and comprises two mating parts, each part having a hinged edge and a free edge, the free edges being flexible so that when the cover is closed the free edges meet and allow a cable to pass freely therebetween and permit free movement of the cable along the length of the cover.

In yet another embodiment of the invention the vertical frame member contains at least one power and/or signal cable outlet, the outlets being positioned at a predetermined desired location.

In one embodiment the vertical frame member has an opening in an exterior surface extending substantially throughout its length and a cover means therefor which can be opened and closed, the cover means when open providing access to cable and cable outlets located in the channel, and when closed the cover means conceals the opening.

Although the furniture frame system of this invention can be associated with conventional furniture components in a non-supporting manner, in a preferred embodiment the frame system of this invention is integrated into the supporting structure of the furniture components. Preferably, the horizontal and vertical frame members have attachment means for securing and supporting one or more furniture components such as a shelf, a privacy panel, a tack board, a privacy gable, a work surface, a cabinet, a drawer unit, an overhead storage unit, a lamp, an overhead lamp, a counter, a gable, a white board, a glazing unit, a holder, a tray, a cabinet and a support bar. It is intended to limit this invention to the above furniture components.

In one embodiment the attachment means is such that the exterior walls of the horizontal frame member have a top support bracket hanger lip extending horizontally along the length of the beam and a top support bracket tie down slot extending parallel to the hanger lip for the attachment of furniture components.

In another embodiment at least one vertical frame member is used in supporting a furniture component and the attachment is such that, said member has at least one attachment surface selected from a groove or a track member provided in the furniture component for receiving a furniture component.

In yet another embodiment the vertical frame member is rectangular and has a U-shaped channel along its length for passage of power and/or signal cable and, the vertical frame member further comprises a T-shaped track means mounted on walls of said U-shaped channel for cooperating sliding engagement with arm members or groove members of elements for connecting one frame member to another frame member.

Although in a preferred embodiment of the invention, the furniture components have attachment walls with a track, groove, pin or slot for receiving a pin that cooperates with the grooves and tracks on the vertical and/or horizontal frame members, a person skilled in the art would understand that conventional forms of attachment, such as, for example, fasteners, brackets and hinges, may be used to fix the components to the frame system.

The vertical and horizontal frame members of this invention can be arranged in a number of ways to provide a continuous cable channel. In one embodiment, three or more vertical frame members are arranged to form a corner, and a cable chase is arranged in the corner.

In another embodiment at least two vertical frame members are connected end to end to form a continuous channel.

In a preferred embodiment the furniture frame system comprises at least one unit, a unit comprising two vertical frame members and one horizontal frame member wherein the first end of at least one horizontal frame member abuts the upper end of one vertical frame member at work surface height and the second end of the horizontal frame member abuts the upper end of the other vertical frame member at work surface height, the abutting frame members forming a continuous channel for the passage of cable.

In another embodiment the furniture frame system of the invention comprises at least two units wherein at least one of the vertical frame members of one unit abuts at least one of the vertical frame members of another and are connected by suitable connecting means, preferably a butterfly hinge, the units forming a continuous channel for the passage of cable.

In yet another aspect, this invention provides a furniture frame system for supporting furniture components and providing a continuous cable channel comprising:

(a) at least one horizontal frame member having a first end and a second end, and a top and a bottom surface;

(b) at least two vertical frame members, each vertical frame member having an upper and a lower end, wherein each frame member has at least one concealed main channel for the passage of cable and for cable outlets, each channel extending the entire length of the frame member, and defined by walls with ports for ingress and egress of the cable, the frame members also having interior and exterior grooves, tracks and screw ports for attachment of furniture components and other frame members, wherein each end of the horizontal frame members abuts vertical frame members at work surface height, the abutments being selected from the group of abutments consisting of port to port; port to end; end to port; and end to end, wherein the horizontal frame member has a central longitudinal opening in its top surface, the opening extending substantially the length of the main cable channel and a cover means therefor which can be opened and closed without the use of tools, said cover means comprising two mating parts, each part having a hinged edge and a free edge, and the free edges being flexible, the cover means when open, providing access at work surface height to substantially the entire channel and when closed, the cover means conceals the opening, but the flexible edges permit cable to pass in and out of the cover and freely move along the length of the cover; and excess cable can be stored and concealed in the channel of the horizontal frame member; and wherein the horizontal frame member has an associated secondary cable channel, located below the main cable channel; and wherein the secondary cable channel is detachably secured to the horizontal frame member for rapid installation and deinstallation, the secondary cable channel abutting at least one vertical frame member in such a manner as to provide a continuous cable channel therethrough.

Furthermore, the furniture frame system of this invention can be incorporated with traditional furniture structural components, including traditional legs or other supporting means.

In a further aspect of the invention, a support element for supporting accessories, including furniture components, is provided. The support element comprises a base, and at least three prongs that project from the base for supportingly engaging an accessory. The prongs are spaced apart and arranged on the base to describe at least one triangle. Any three or more of the prongs cooperate to support and hold the accessory in a selected position, and any one or more of the prongs may independently serve to support the accessory in a selected position.

In one aspect of the invention it is apparent that the support accessory is particularly well suited to being mounted in a channel of the vertical frame member of the furniture frame system described herein. The support element serves to support accessories, including furniture components.

The invention will be better understood with reference to the accompanying drawings in which:

BRIEF DESCRIPTION OF THE DRAWINGS

FIG. 3B to 3I are top plan views of a variety of connections that may be made between vertical frame members of the invention;

FIG. 5A is a section view through a horizontal frame member of the system of FIG. 1, and FIG. 5B and FIG. 5C are section views through horizontal frame members of alternative embodiments showing different openings into a channel, FIG. 5D is a side section view of a frame system having two horizontal frame members;

FIG. 6 is a perspective view of the horizontal frame member and vertical member connection of the system of FIG. 1;

FIG. 7 is a perspective view showing the attachment of a cover to the horizontal frame member of the system of FIG. 1;

FIG. 8 is a perspective view of an open gable connection to a vertical frame member of the frame system of FIG. 1;

FIGS. 10 and 11 are perspective views of the drop-in connection of vertical frame members of the frame system of FIG. 1;

FIGS. 16, 17 and 18 are perspective views of trim elements on a vertical frame member of the system of FIG. 1;

FIGS. 21, 22, 23, 24 and 25 show perspective views of connections of a spacer bar, a decorative panel, a privacy panel, a closed gable, a transaction shelf, and a lamp to the frame system;

DETAILED DESCRIPTION OF THE INVENTION

Figure 1:
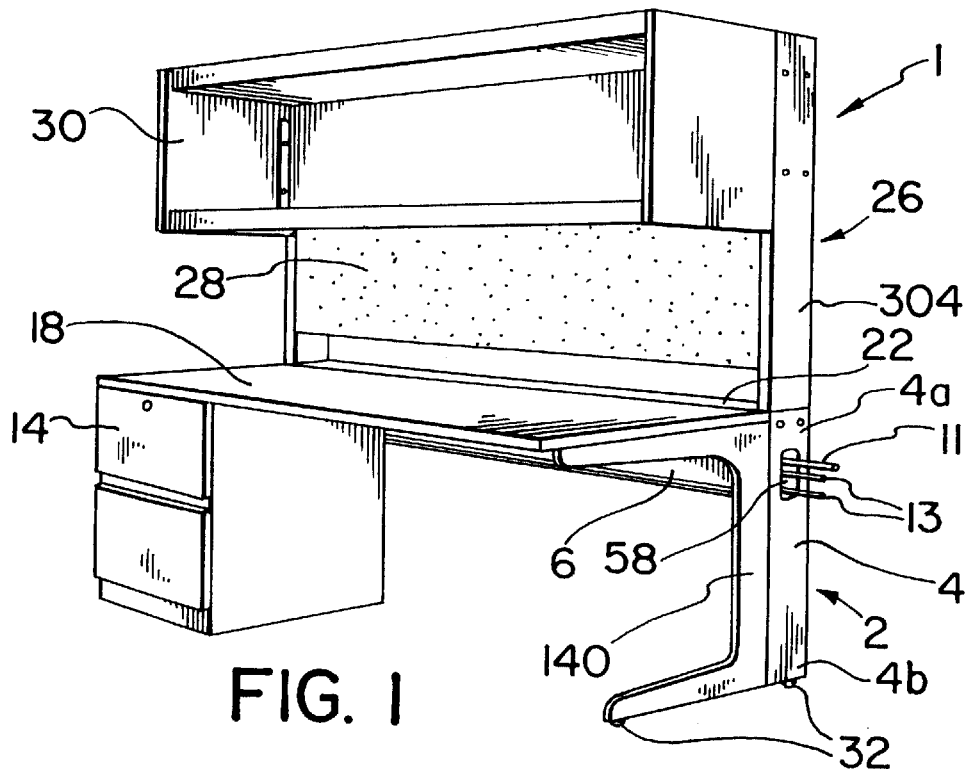
FIG. 1 is a perspective view of an embodiment of a furniture frame system of this invention.

Referring to FIG. 1, there is illustrated a preferred embodiment of an assembled frame system of the present invention designated generally at 1. There is shown an upper frame 26 attached to a lower frame 2. The lower frame 2 comprises vertical frame members or legs 4 and a horizontal frame member 6 joins pairs of legs 4 (only one of which is shown). The upper frame 26 is connected to lower frame 2 for support and comprises vertical frame members/legs 304. The upper frame 26 supports accessories which include a tackboard 28 and an overhead storage assembly 30. Both horizontal 6 and vertical frame members 4, 304 have at least one concealed structural channel (not visible) for power cables 11 and signal cables 13 and preferably have power and signal cable outlets (not shown). The frame members have ports or openings for ingress and egress of cables 11, 13, such as porthole 58 in leg 4. The frame system can be arranged in a number of configurations to meet the needs of the user, and which result in a number of different abutments between vertical frame members, between horizontal frame members and between vertical and horizontal frame members (not shown). The abutments are selected from the group of abutments consisting of: end to end, port to end, end to port and port to port resulting in a continuous channel (not shown) for the passage of cable.

Furniture component accessories such as, cabinet units 14 are secured, such as by brackets (See FIGS. 9A and 9B) to the legs 4 of the lower frame 2. Horizontal frame member 6 is secured to and supports work surface 18. Horizontal frame member 6 has an opening (not shown) covered by cover 22 which provides access to cables in its associated channel (not shown). Details of these structures will be described later. The cover 22 preferably lies flush with the work surface 18, and cables may lead to the work surface from the channel through an opening in the cover (not shown). It should be noted that bottom end 4b of leg 4 is provided with an adjustable foot 32, as is secured open gable 140.

Figure 2:
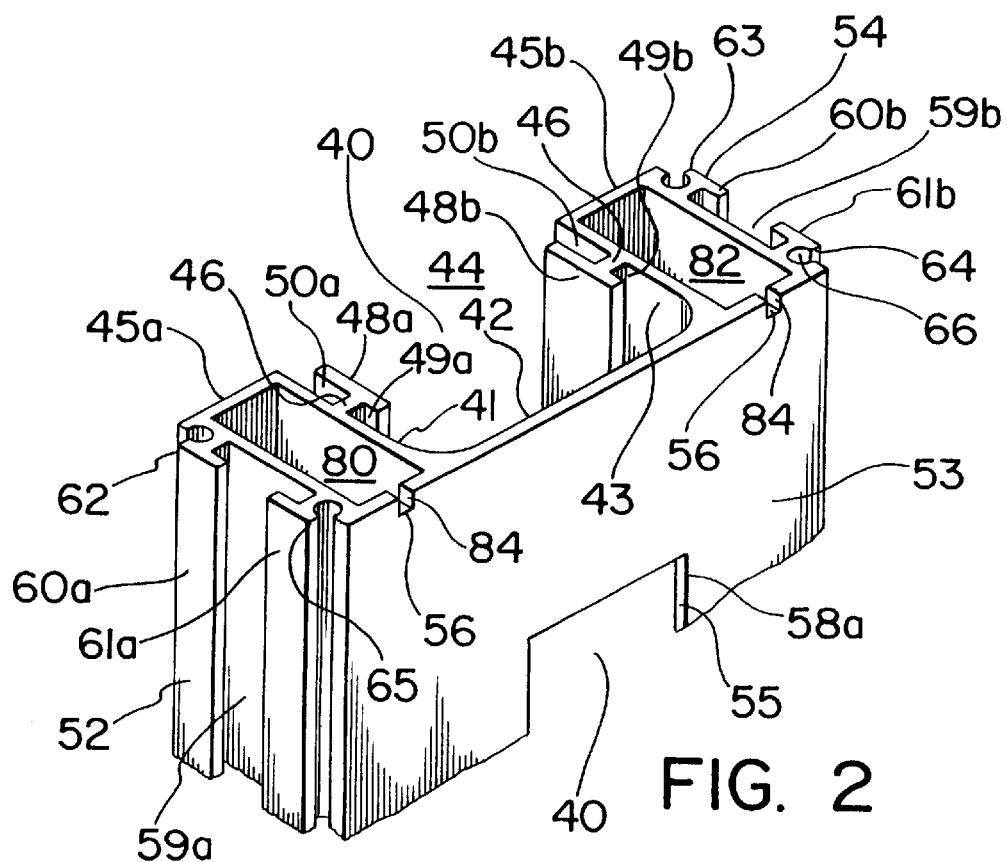
FIG. 2 is a perspective view of one end of a vertical frame member of the system of FIG. 1.

The top 4a of leg or vertical frame member 4 will be described in greater detail with reference to FIGS. 2 and 3A. The leg is an elongated U-shaped frame, preferably made as an aluminum extrusion, or from other suitable material. The leg 4 has a top end 4a to which the horizontal frame member 6 is connected, and a bottom end 4b which rests on the floor and has an adjustable foot 32.

Interior walls 41, 42 and 43 of leg 4 define an inner cable channel 40. Interior wall 42 has a porthole 58a defined by walls 55 through which cables 11, 13 may be passed. A second porthole 58c (which may be seen in FIG. 5D) is provided below porthole 58a, if desired. The vertical frame members can be adapted to the needs of the user and as such, the number of portholes or openings therein will vary accordingly. On walls 41 and 43 adjacent opening 44 to channel 40, arms 46 and flange portions 48a and 48b define inner grooves 49a and 49b, and outer grooves 50a and 50b, for attachment of brackets (not shown) or other connections (not shown) to the leg 4. Outer walls are spine 53 and side walls 52, 54. The spine 53 has notches 56, and a porthole 58a. Cables may be passed through the portholes and connection between legs 4, 4 may be made by fixing bracket 95 to walls 55 surrounding the portholes 58 (as shown in FIG. 4). The side walls 52, 54 of the leg are mirror images of each other. Each side wall 52, 54 has a T-groove 59a, 59b defined by opposed L-shape arms 60a, 60b, 61a, 61b in the wall 52, 54 centrally placed between the spine 53 and a front face 45a, 45b. At corners 62, 63, 64, 65 of the side wall, a groove 66 having a semi-circular cross-section is provided along the length of leg 4 for attachment of trim pieces (not shown in this view) or butterfly hinges 90 (shown in FIG. 3A) to connect together individual legs 4. First and second internal rectangular cavities 80, 82 are provided in leg 4 and extend throughout its length. Notches 56 provided in walls 42 and 53 align to provide channels 84 in the walls.

Figure 3A:
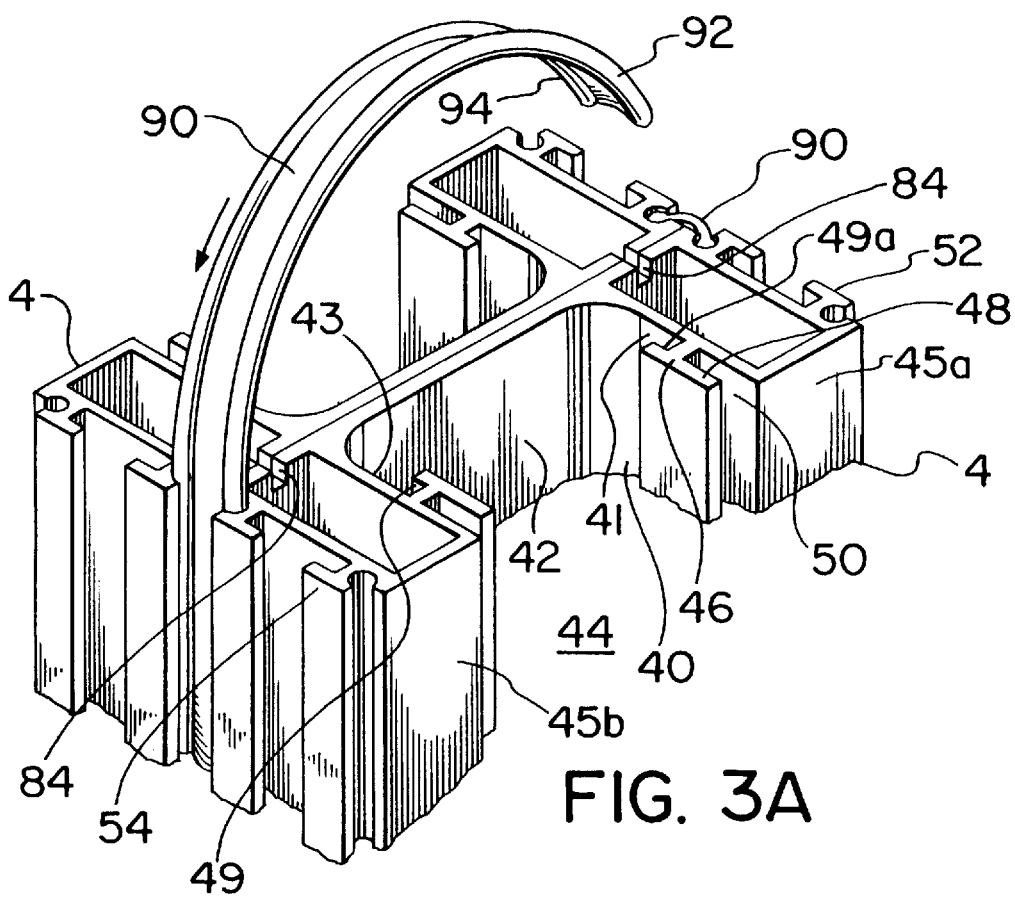
FIG. 3A is a perspective view of an in-line connection of vertical frame members of the furniture frame system of FIG. 1.
Figure 4:
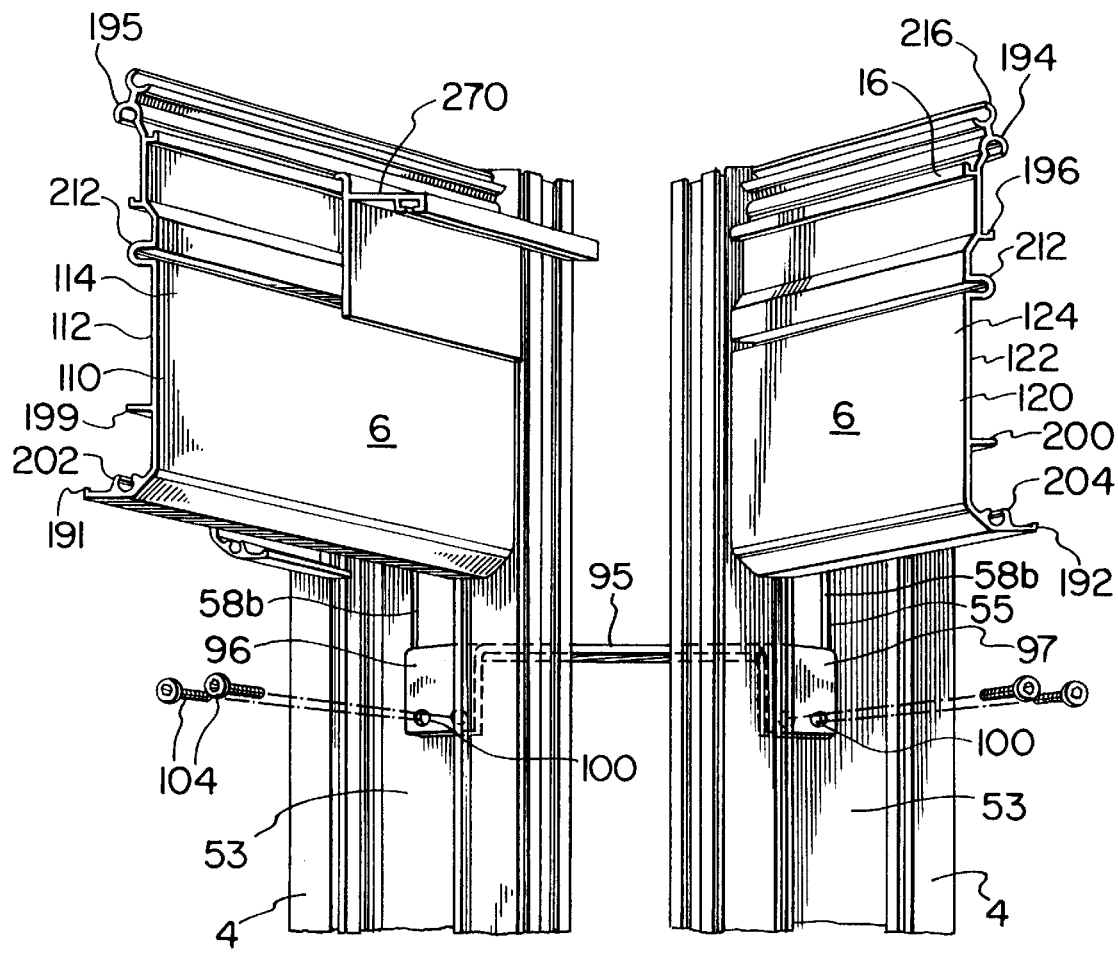
FIG. 4 is a perspective view of a bracket connection of a pair of vertical members in a frame system of the invention.

As shown in FIG. 3A, adjacent legs 4, 304 may be connected together by placing them in a back-to-back arrangement, such that like parts are aligned. When so arranged, a flexible butterfly hinge 90 may be used to connect the two legs 4, 4. The hinge 90 is an elongated strip of flexible material having enlarged side edges 92, 94, each edge being suited to slide in and engage grooves 66. The connection that is achieved keeps the backs or spines 53 of legs 4 flush with each other.

Referring to FIGS. 3B through 3G, the flexibility of the frame system is illustrated by showing a number of possible ways to connect two, three or four legs 4 together using one or more butterfly hinges 90. FIGS. 3H and 3I illustrate a manner of connecting together pairs of legs using a bracket 95 fixed to the legs 4. FIGS. 3B and to 3I also show an alternative embodiment of the opposed arms 60a, 60b, 61a, 61b of the sidewalls 52, 54 of legs 4. The opposed arms 60a, 60b, 61a, 61b may be substantially T-shaped, and inwardly projecting portions 60c, 61c may be provided for distributing stress from the opposed arms to component connections mounted in the track.

Referring to FIG. 4, the connection of pairs of legs 4 using a plate or bracket 95 fixed to the legs 4 is shown clearly. A bracket 95 has downwardly turned ends 96, 97 which fit in portholes or openings 58b in spines 53 of legs 4. Each plate end 96, 97 has pre-drilled screw holes 100 and leg 4 has corresponding openings (not shown) therein for connecting the plate to the leg 4 using screws 104. In this manner, the legs 4 can be held by bracket 95 in a selected stable position.

Also shown in FIG. 4 is the horizontal frame member 6 connected to leg 4 at the top end 4A of the leg 4. The horizontal frame member 6 is preferably an extrusion product, and has walls 110, 120 having tracks, grooves and screw ports 191, 192, 194, 195, 196, 199, 200, 212 and 216 provided on its interior 112, 122 and exterior walls 114,124, better described by reference to FIGS. 5A to 5D.

FIGS. 5A to 5D show a horizontal frame member and the power and signal cable channels. FIGS. 5A and B show the opening 20 in the top surface of the horizontal frame member and a channel 8 therein. Referring to FIG. 5A, the electrical or power cable trough 10 is shown between opposed walls 110, 120 and in channel 8. Signal cable trough 12 is a separate trough that has a continuous wall 130 defining the trough 12, and opening 132 and L-shaped flanges 133, 134 on opposed sides of the opening 132. The flanges 133, 134 engage inwardly projecting walls 191, 192 of the power cable trough 10 to hang the signal cable trough 12 below the power cable trough 10. The signal cable trough 12 is made from resilient material, so that pressure applied to the sides of the trough along continuous wall 130 causes the flanges 133, 134 to release and the signal cable trough can be detached to provide easy access to signal cables. An alternate embodiment is shown in FIG. 5B, wherein the signal cable trough 12 is in channel 8 of horizontal frame member 6 below the power cable trough 10, and horizontal frame member opening 132 is closed by cover plate 193.

In FIG. 5C, there is shown a transverse cross-section of a horizontal frame member 6 to which is secured at its upper surface a channel or trough 400 which houses electrical receptacle 401 and power harness 402 which are secured to mount bar 403. Base cover 404 enables side access from a work surface 18. A further alternative is shown in FIG. 5D, wherein two horizontal frame members 6, 6 are used, one at work surface height and one at floor level.

Referring to FIGS. 5A and 6, in the preferred embodiment (FIG. 5A), the horizontal frame member interior walls 112, 122 extend horizontally between legs 4, 4 (only one of which is shown). At each end, each interior wall 112, 122 has a screw port 194, 195 respectively for hanging the walls 110, 120 on the legs 4. Screws 116 may be drilled into legs 4 through openings 118 to support the walls 110, 120. The screw port 194, 195 is a C-shaped groove that projects into the channel 8 from the interior wall 112, 122 and extends along the wall. Also on the interior wall 112, 122, is a hanger lip 196 which is provided to support a trough spacer or signal jack mount plate (not shown). Toward the lower portion of the channel 198, harness mount track members 199, 200 protrude from internal walls 112, 120 to provide a track for suspending a power harness 180. The lower most portion 191, 192 of each wall 110, 120 projects into the channel 8. The second screw ports 202, 204 are C-shaped elements which provide a groove for engaging a screw and are positioned on projections 191, 192. The screw ports 202, 204 are used to hang walls 110, 120 on legs 4 using screws 116 drilled through openings 119 (as shown in FIG. 6).

On the exterior walls 114, 124 of the horizontal frame member 6, a top support bracket hanger lip or horizontal track 16, extends horizontally along the length of the horizontal frame member 6. Below the hanger lip 16, a top support bracket tie down slot 212 is provided which extends parallel to the hanger lip 16 and is useful for bolting or otherwise fixing brackets or clips (not shown) against up and down movement.

FIGS. 6 and 7 provide a detailed view of a wall 114 of horizontal frame member 6, and elongated hinged cover 22 is shown with free edge 214, and hinge connection 216. The hinge connection 216 comprises a circular track 218 fixed to the channel side 220 of the cover 22, and curved arms 222, 223 connected to the channel side 220 of the cover provide curved slots 224 on opposite sides of the circular track 218 forming a hinged edge. The trough lid hinge socket 226 is C-shaped and fits into slots 224 on the cover 22 by a snap fit. Cables may lead to a work surface through ports or openings (not shown) in the cover, or through opening 23 between flexible free edges 214 on a two piece, hinged cover 22.

As shown in FIG. 8, open gable 140 is connected to leg 4 and has an overall C-shape, with a supporting arm 142, work surface support arm 144 and spine 143. Spine 143 has T-shaped track 146 defining an H-groove. T-shaped track 146 drops and slides into T-groove 59a, 59b on leg 4 for a secure connection.

Figure 9A:
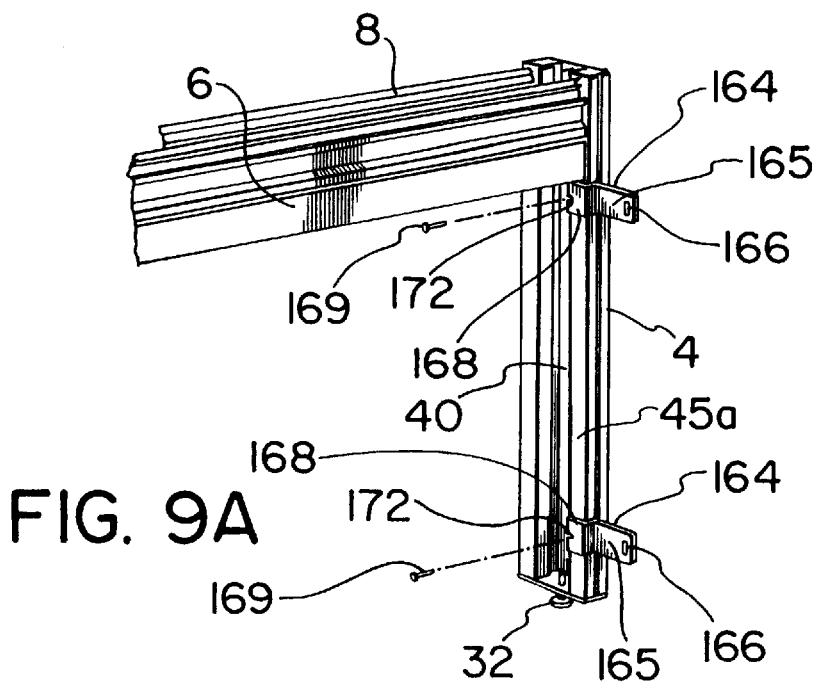
FIGS. 9A and 9B are perspective views one embodiment of a furniture frame system of the invention.
Figure 9B:
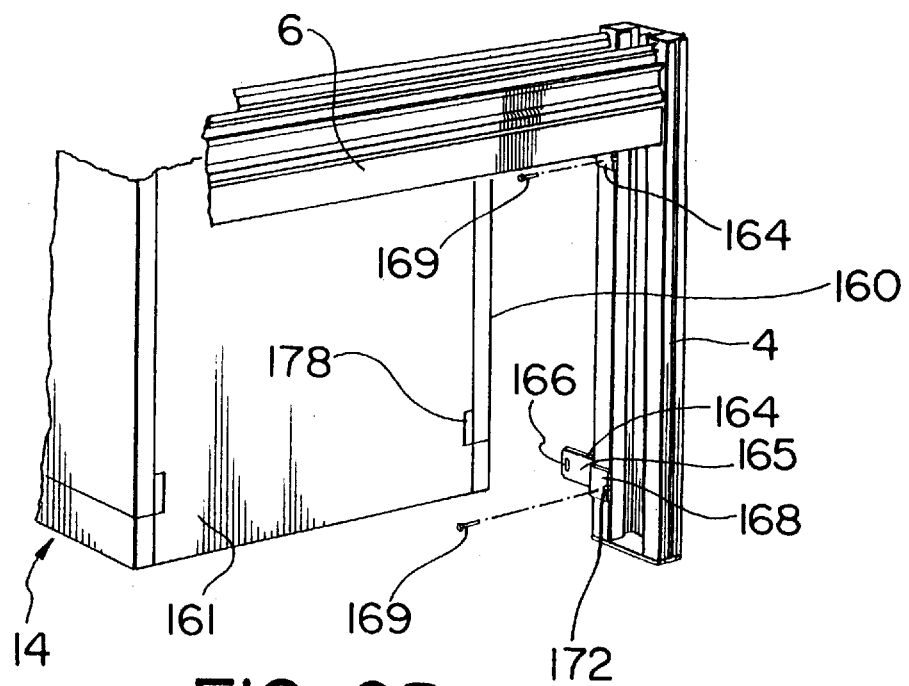

FIGS. 9A and 9B show brackets 164 in different orientations on leg 4. Bracket 164 is in position to be fastened to leg 4 using screws 169 which extend through hole 172 in bracket arm 168 and into leg 4. Bracket plate 165 is then slid into slot 178 provided in back wall 161 of a cabinet unit 14 (FIG. 9B). Bracket plate 165 has a hole 166 for receiving fastening means such as a screw (not shown) so that bracket plate 165 can be fastened to a wall 160 of the cabinet unit 14.

Referring to FIG. 10 there is shown an exploded view of two vertical frame members 304 and 4 which may be connected by means of a U-shaped aligning channel 306 in channels 40 of legs 4 and 304. The fit between members 304 and 4 is a press fit with additional frictional fit means 312 all of which helps maintain the members 304 and 4 in position.

As shown in FIG. 11, to secure the connection, a top down threaded, leg connection anchor 316 is fed through opening 317 in leg 4 into channel 80, 82 and is seated in internal cavity 80 of leg 4 adjacent top end 4a. A top up leg connecting anchor 318 is fitted to leg 304 through opening 319 in leg 4 into channel 80, 82 and fixed in channel 80, 82. The legs 4, 304 are bolted together using a bolt 320 and lockwasher 322 which are introduced into channel 40 of leg 304 through access slot 324 and seated in bolt slot 325 in top up leg connection anchor 318. The bolt is then tightened into locking engagement with leg down connection anchor 316 to secure the connection.

Figures 12, 13:
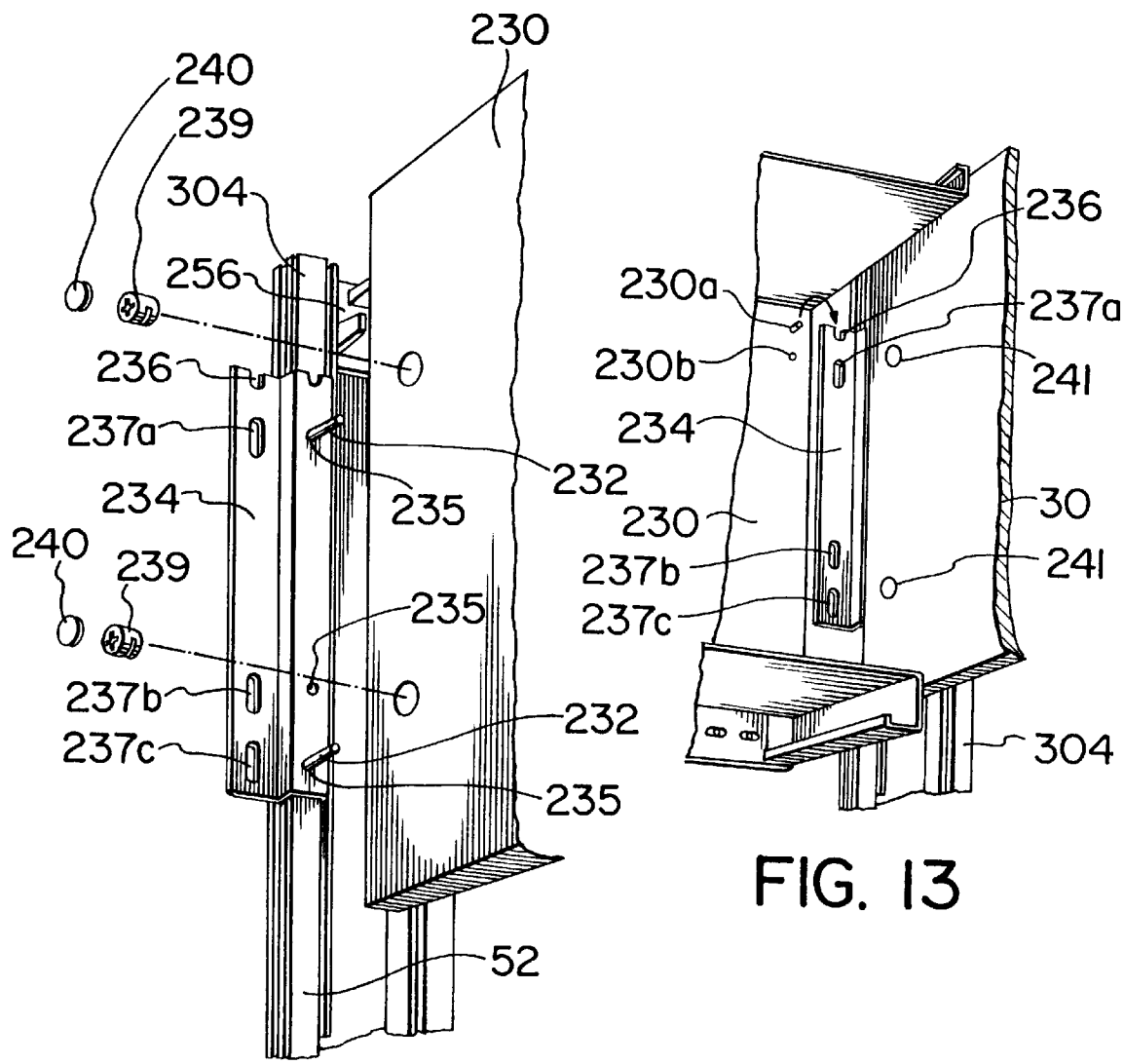
FIG. 12 is a perspective view of the preparation of the frame member to accept an overhead cabinet in the frame system of FIG. 1.
FIG. 13 is a perspective view showing a method of connecting a cabinet to the frame system of FIG. 1.

Referring to FIGS. 12 and 13, there is shown a back panel 230 installed on the legs 304 using minifix pins 232 seated in holes in leg side wall 52. A bracket 234 is fixed to the leg for hanging the assembled storage assembly 30 by feeding the minifix pin 232 through predrilled holes 235 on the bracket 234 and then the pins 232 are slid into openings (not shown) provided in the back wall 230 of the panel. The connection is completed by tightening a locking pin 239 in opening 241 to secure the minifix pins 232. Locking pin 239 is covered with trim piece 240. The overhead storage unit 30 is assembled before mounting the unit.

Referring to FIGS. 12 and 13, a mounting bracket 234 is secured to a back panel 230 by means of locking screw means such as minifix pins 232 and locking pin 239. Once secured to the back panel 230, the assembled panel 230 and bracket 234 may be secured to a storage assembly 30 and the frame by means of screws 230a, 230b projecting from the joining surface which fit into appropriate apertures 237a, 237b, 237c in bracket 234.

Overhead storage unit 30 is connected to upper frame 26 by fixing it to legs 304. The back panel 230 is first fixed to the leg 304 by minifix pins 232 being inserted into horizontal slots in the side edge of the back panel. Prior to inserting the pins into the horizontal slots, a storage assembly support bracket 234 is mounted on the pins through openings 236 provided on the bracket, and once the pins are in place in the back panel 230, locking pins 239 are tightened and cap 240 is placed on the pin. The remaining portions of the overhead storage unit are then assembled, and a single screw is provided on an exterior edge of the storage unit and is engaged in slot 237a, 237b, or 237c on bracket 234 to hang the storage unit in position on the legs. The positioning of the pin is selected according to the desired height of the shelf, and the bracket position is also determined according to the desired height. Additional screws are used to firm up the connection between the back panel 230 and the shelf unit, and the shelf unit and the legs.

Figure 14:
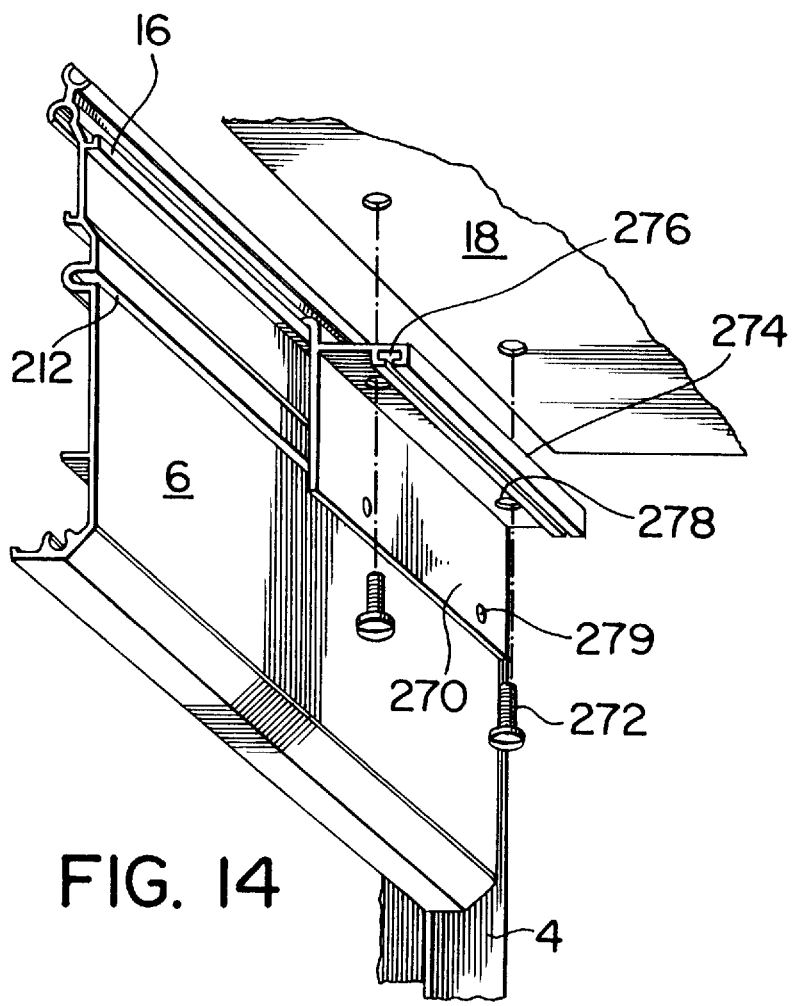
FIG. 14 is a perspective view of connection of a work surface to the lower frame of the system of FIG. 1.

Referring to FIG. 14, which shows the assembly and connection of a work surface 18 to the frame system, a bracket 270 is suspended on hanger lip 16 and secured to the horizontal frame member 6 through holes 239 using screws (not shown) sunk into top support bracket tie down slot 212. A plate 274 projects from the bracket wall 270 for supporting work surface 18 and is provided with a T-groove 276 projecting downwards towards the floor for attachment of accessories (not shown). The plate 274 has openings 278 to receive fasteners such as screws 272 to secure work surface 18 to the plate and, accordingly, the horizontal frame member.

Figure 15:
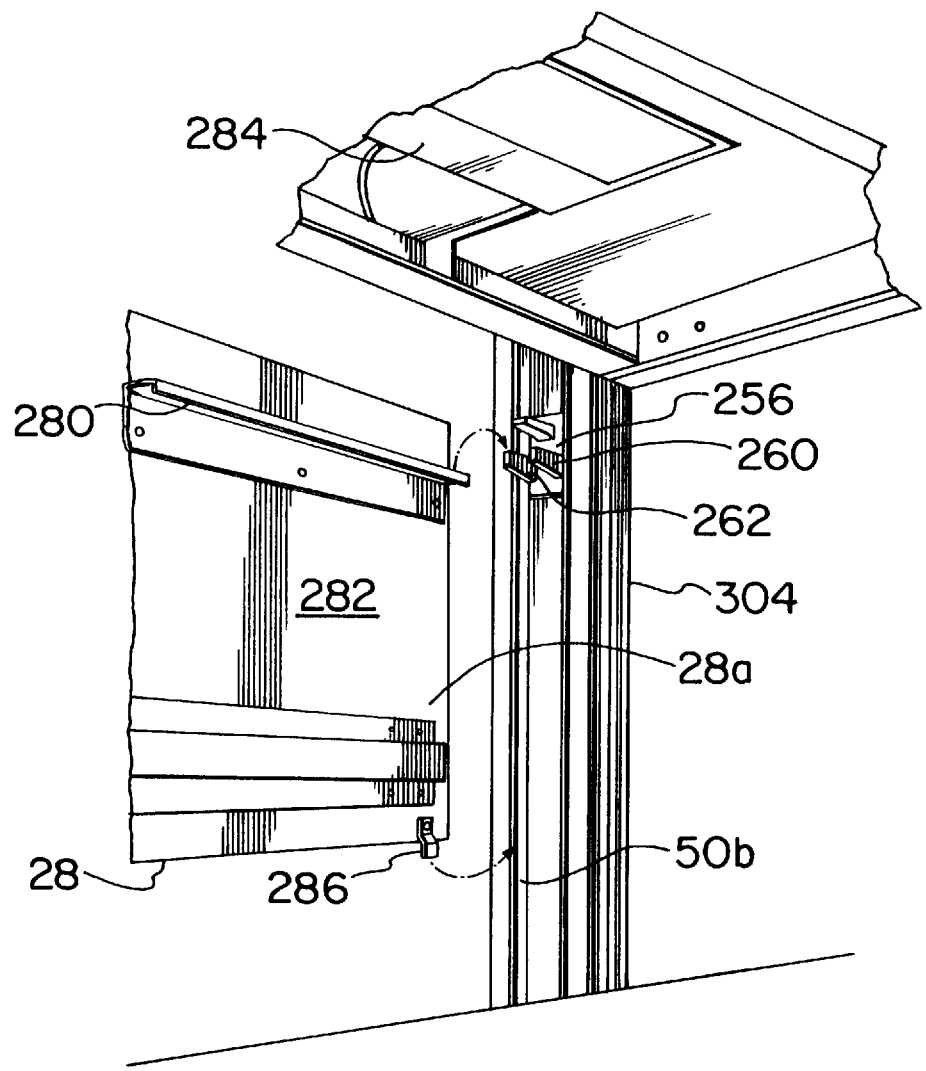
FIG. 15 is a perspective view of connection of a tackboard to the upper frame of the system of FIG. 1.

FIG. 15 illustrates the connection of a tackboard 28 to an upper frame 26. Three prong support 256 is inserted into channel 40 of leg 304, and secured, and a second similar three prong support (not shown) is fixed in channel 40 on a facing leg (not shown) or upper leg (not shown). The support element 256 has a base 257 and three prongs 258, 260, 262 (see FIG. 18) are spaced apart and arranged in a triangle on the base 257 (as shown in FIG. 18). The prongs 258, 260, 262 project from the base 257 to act as supporting arms alone or in cooperation with one or more of the other prongs. As shown in FIG. 15, a tackboard 28 has a hanger 280 affixed to the back of the board 282 for engaging prong 262 of prong support 256 for hanging the tackboard 28 onto the prong 262 on the leg 304. A pivoting engaging hook 286 is provided on a side edge 28a of the tackboard 28 for engaging groove 50b of the vertical frame member or leg 304.

It will be apparent that the furniture components in the alternative embodiments of the invention, such as an overhead lamp, and various privacy panels may be attached in similar fashion to the components discussed in relation to the preferred embodiment. The connections of the slot and groove cooperating elements, and the minifix pins in T-slots are used to connect the remaining elements and it will be apparent from reading the preceding how to connect a variety of other furniture components according to the specific installation and needs of the consumer.

To complete the system and provide enhanced aesthetic value to it, and referring to FIGS. 16, 17 and 18, trim elements are added to the legs and outwardly facing portions of the frame. An end panel 350 is attached to the spine 53 of a leg 4, 304, and it consists of a flexible plate of the same width as the spine 53 of the leg 4, 304 and the same length or height as the leg 4, 304, and having expanded, C-shaped end edges having tracks 352 which are adapted to engage grooves 66 on the side edges of the legs. In a unit having legs 4 and 304, end panel 350 will cover the entire height of the frame system 1. The decorative end panel 350 is connected to the leg in grooves 66 by a snap fit. An end panel (or cover 351) can also be snapped into grooves 66 and adapted to cover opening 44 and conceal all or part of channel 40 when the arrangement of the legs leaves the channel exposed. The cover can easily be attached and removed to provide access to channel 40.

On the top of each leg a cap 356 is placed on the leg end to cover the channels 40, 80, 82, and to smooth over the surface of the end edge of the leg. Accordingly, a flexible post cap 356 having projections 358 for engaging the inner channels 40, 80, 82 of the leg 4, 304 is placed over the end of the leg and snapped into position. Top trim 360 may be installed on the top of the upper frame assembly, and comprises a flat plate with wing members projecting out of a bottom surface 366 of the plate for engagement with the three pronged hanger 256 that is positioned adjacent the upper end leg 304 of the upper frame. The wings 364 are parallel and opposed, and have a neck portion 368 that allows the first and highest prong 258 of the three pronged hanger 256 to pass through the neck 368, and the neck portions 368 then pass between the parallel prongs 260, 262. The wings 364 press outwardly to engage prongs 260, 262 and secure the cap 356 on top of the frame assembly.

The power and signal cables 11 and 13 respectively may enter the frame system from the floor or the ceiling or anywhere along the height or length of the frame system. As shown in FIG. 1, cables enter the frame system through port hole 58 in leg 304. Referring to FIG. 2, once the cable is in leg 4, it can run down channel 40 of leg 4 or up into channel 40 of leg 304. The cable may also pass through opening 44 and into channel 8 of horizontal frame member 6. In an alternative embodiment, multiple cable channels or raceways may be provided. As shown in FIG. 1, the frame system is set up on an access floor (not shown), or the power feed is otherwise under a leg 4 or floor level horizontal frame member 6, then the power and/or signal cable may enter the frame through an opening (not shown) into the leg 4 or horizontal frame member 6. If the power and/or signal cable feed is from a wall (not shown) then the cable enters the frame system through a porthole in a leg 4 or horizontal frame member 6, and the porthole may be created on-site to accommodate the available cable feed. If the power and signal cables are fed to the frame system from a ceiling, then a corner connection is extended up into the ceiling and the power feed and/or communication cable is housed and channelled to the frame system through a cable chase 410 (as shown in FIGS. 20A to G) defined in the corner connection. The cable chase integrates the power feed and signal cable with the frame system, and is not a separate element from the frame system.

Figure 19:
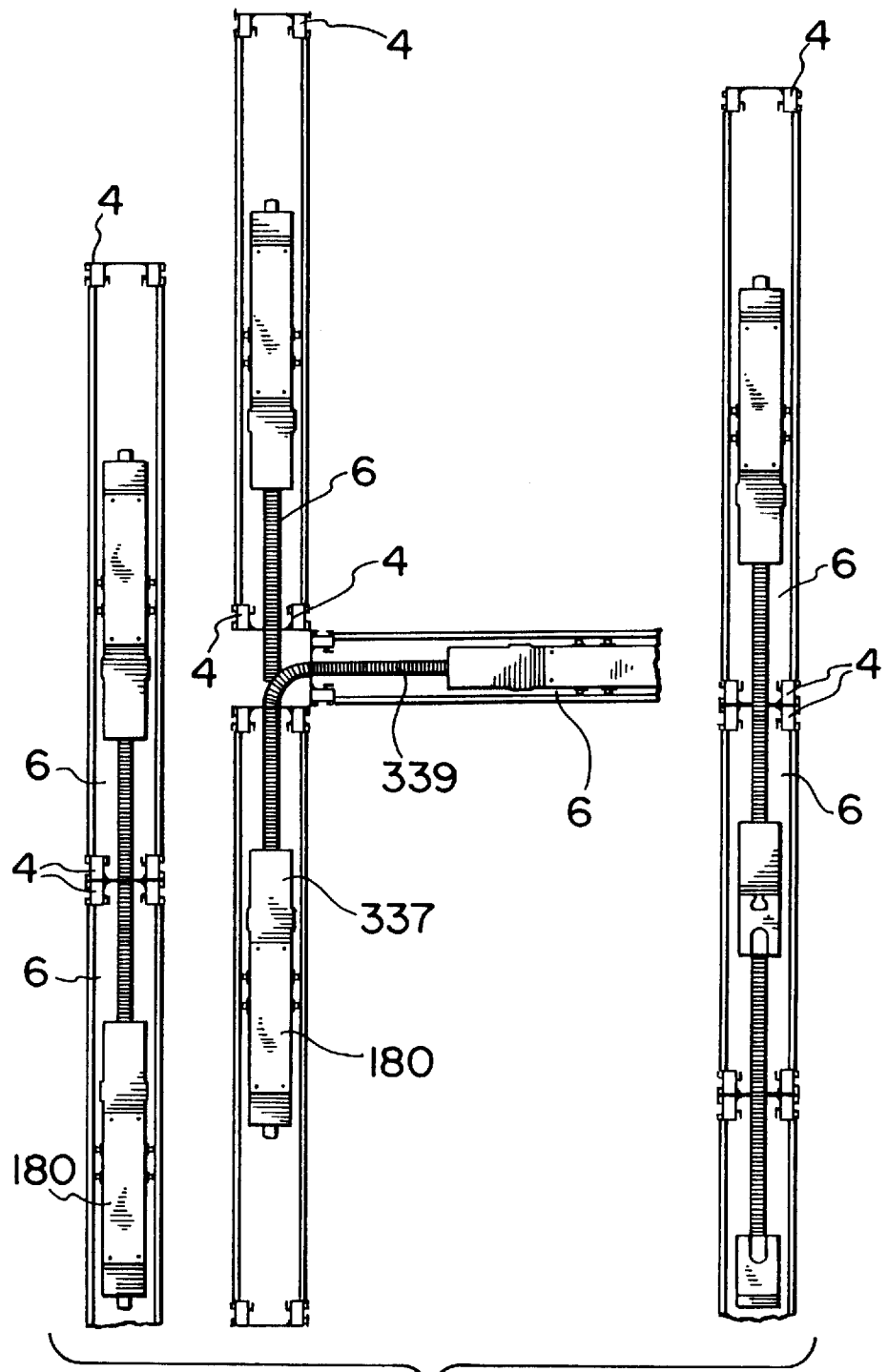
FIG. 19 the power cables in the horizontal frame member of the frame system of FIG. 1.

As shown in FIG. 19, power harnesses 180 are connected together via a power jumper 337 linked by cable 339.

As shown in FIGS. 5A, 5B, 5C, 5D and 20A to G, to provide receptacles or outlets (not shown) to which lamps, computers, and other electric equipment are connected, the horizontal frame member 6 is preferably equipped with a power harness mounting carriage 331 which is mounted in channel 8. The mounting carriage 331 has resilient V-shaped arms 332a, 332b with grooves 354 for spring lock mounting of the harness 180 in the harness mount track 199,200.

The frame system of the present invention is assembled according to a plan and the number of legs, horizontal frame member walls and furniture components will be determined according to the particular installation. To configure the embodiment shown in FIG. 1, walls 110 and 120 of the horizontal frame member are attached to legs 4, 4 by connecting fasteners such as screws through the leg 4 and into screw port 194, 195 and 202, 204. The power harness 180 is usually installed in the factory, but otherwise can be installed at the installation site by a trained individual. As shown in FIGS. 5A and 5B, the power harness 180 is provided with clips 332a, 332b which connect by snap fit to harness mount track 199, 200 projecting from the interior sidewalls 112, 122 of the horizontal frame member. Power jumpers 337 are then connected to the power harness 180 and passed through channels or ports in the legs 4 to extend into the next adjacent horizontal frame member 6 for connection to the power harness 180 in that horizontal frame member to create a power network. Power receptacles are installed according to the electrical layout of the installation, and are connected to the power harness 180 by a snap fit connection. Signal cable trough 12 can be snapped into place suspended from horizontal frame member 6 by engaging flanges 133, 134 on horizontal frame member wall projections 191, 192.

Figure 20:
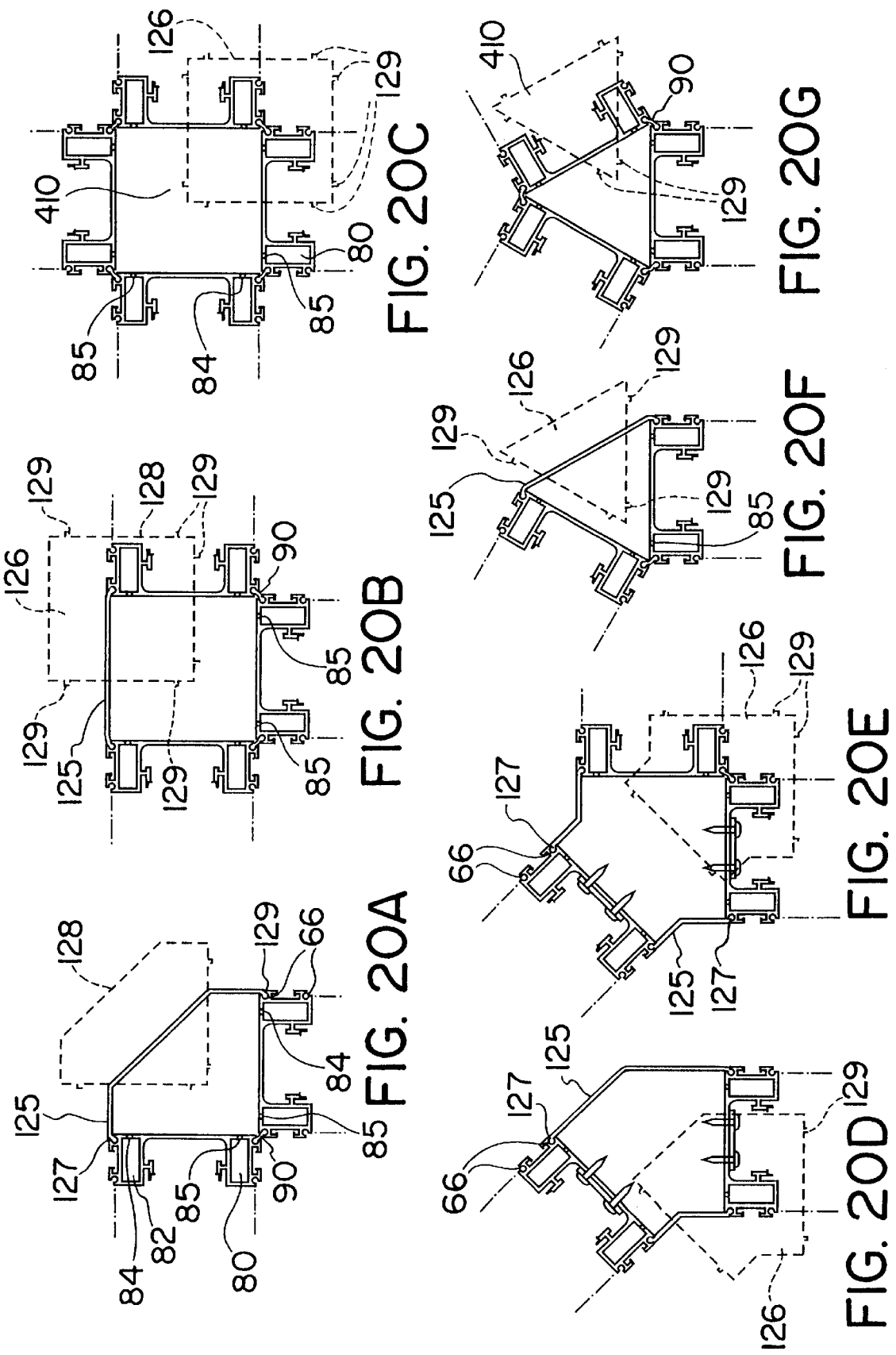
FIGS. 20A–G are top plan view of various connections between vertical frame members of the invention, showing connections of various trim pieces such as end panels and caps.

Referring to FIG. 20A to 20G, once the vertical frame members or legs 4, 304 are connected using brackets and/or butterfly hinges, post corner covers 125 are used for properly aligning the legs 4, 304 and to add strength to the corner created by the joining of the vertical frame members. The post corner cover 125 has enlarged end edges 127, 129 which snap into grooves 66 on legs 4, 304 and are shaped, according to the connection used, to bridge together free edges of vertical frame members. Once the post corner cover 125 is in place, a corner cap 126 having resilient lugs 129 for engagement with channels 84 on vertical frame members 4, 304 is pushed on to the top of the post corner cover for a snap fit into the channels 84 and the post corner cover 125. Referring to FIG. 20C and 20G, it will be seen that a power chase 410 is provided by the spines 53 of the vertical members 304 and 4 that can extend into the ceiling for power and signal cable feed.

Figure 21:
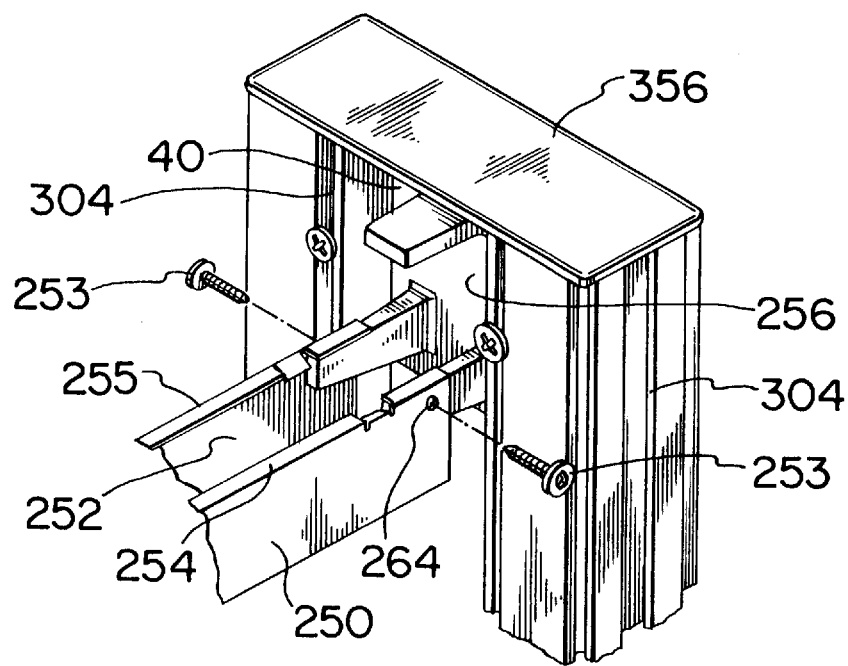

As shown in detail in FIG. 21, a spacer bar 250 is fixed to legs 304 (only one of which is shown) to provide support to the legs 304 of the upper frame 26 and maintain the legs 304 at a desired separation. The spacer bar 250 may also be an aluminum extrusion, and is an elongated rectangular bar having an open top 252, and inwardly projecting flanges 254, 255 provided along the length of the bar 250. To support the spacer bar 250, a three-pronged support 256 is sunk into interior channel 40 of leg 304, and is fixed in position with screws 257 on leg 304. Flanges 254, 255 sit on lower parallel prongs 260, 262 of the support 256, and screws 253 connect the spacer bar 250 to the prongs 258, 260, 262 and are secured through openings 264 in the walls of the spacer bar 250. One spacer bar 250 is shown in FIG. 21, however, it will be obvious that spacer bars may be used in numbers as required.

Figure 22:
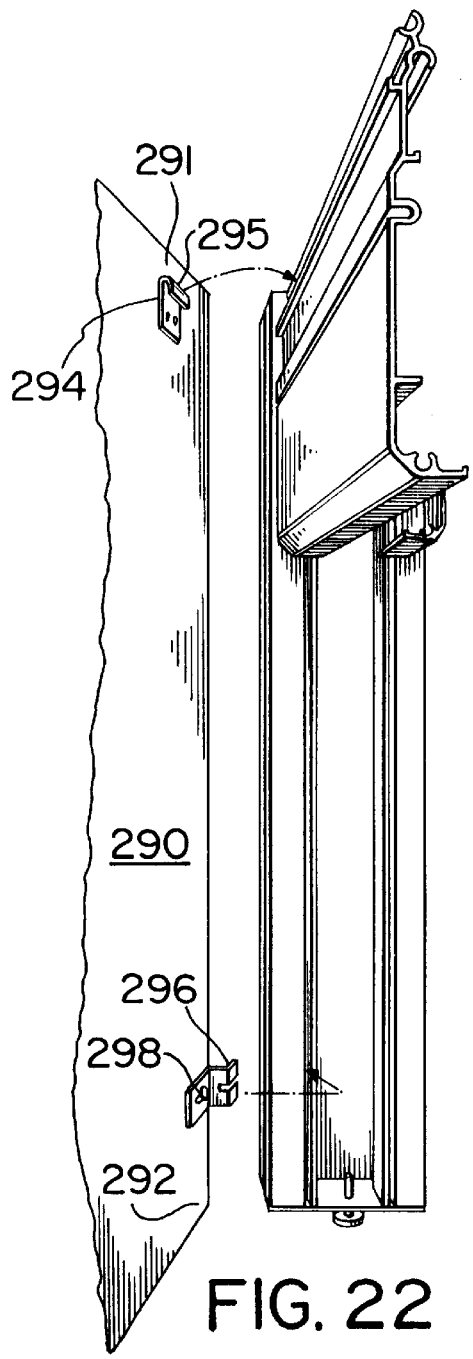

As shown in FIG. 22, to secure decorative panel or shell 290 to lower frame 2, an inverted J-clip 294 is fixed near the top, back edge 291 of the panel and a bracket 296 is provided at bottom corner 292. J-clip 294 has over portion 295 which engages hanger lip or horizontal mounting track 16 provided on horizontal frame member 6. Bracket 296 has slot 298 for receiving a screw (not shown) to fix the bracket to the leg 4. By connecting the panel 290 to the horizontal frame member 6 and leg 4, side to side and up and down movement of the panel 290 is restricted. Once the lower most privacy panel 290 is installed, additional shells or panels having T-shaped tracks (not shown) along back side edges of the shell are slid into engagement with groove 59a, 59b on leg 4, 304, and come to rest on the next lower panel.

Figure 23:
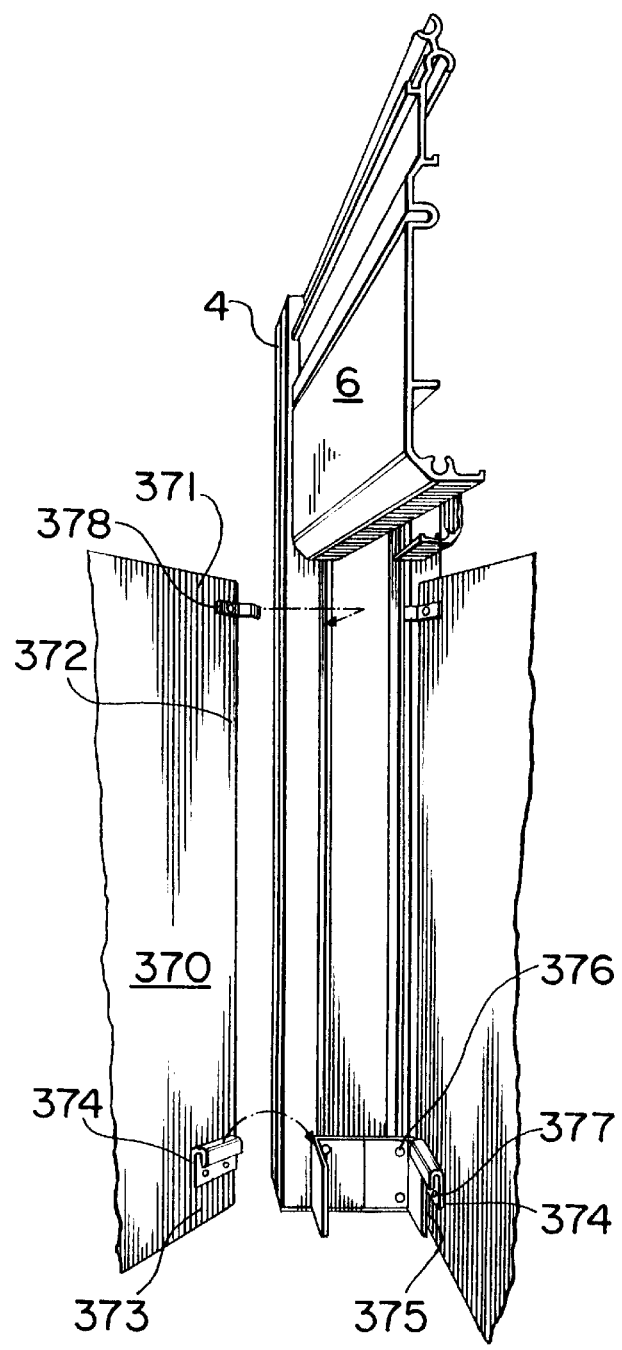

As shown in FIG. 23, a privacy panel 370 has back end edge 372 with a J-clip 374 fixed in a lower corner 373 of the panel 370. A pivoting hook 378 is provided on an upper corner 371. The J-clip engages groove 50a, 50b on leg 4, and inverted J-clip 374 engages bracket 375 fixed to leg 4 by fasteners 376. When the floor plan so warrants, a J-clip and pivot hook are provided on the opposite back side edge of panel 370 to connect that side of the panel 370 to another leg for a secure connection.

As shown in FIG. 24, a closed gable 380 is a supporting member and may be connected to a leg 4. The closed gable 380 has a horizontal hole in the end edge (not shown) for receiving minifix pins 382 in the side of panel 380. The minifix pins 382 have enlarged heads 384 for engaging groove 59a in leg 4, and the pins 382 slide into groove 59a and into the horizontal hole in panel 380. The pins are secured in the slot using locking pin 386 placed in opening 388.

Referring to FIG. 25, a transaction shelf or counter 390 may be connected to the system. The legs 4, 304 have support arms 392 mounted in channel 40. Mounting bar 394 has end openings (not shown) for receiving the arms 392, and are then fixed to leg 4, 304 with fasteners (not shown). A shelf 390 is secured to the mounting bar 394 by screws (not shown) fastened through aligned pre-drilled holes 396, 397 on the transaction shelf 390 and mounting bar 394.

Figure 26:
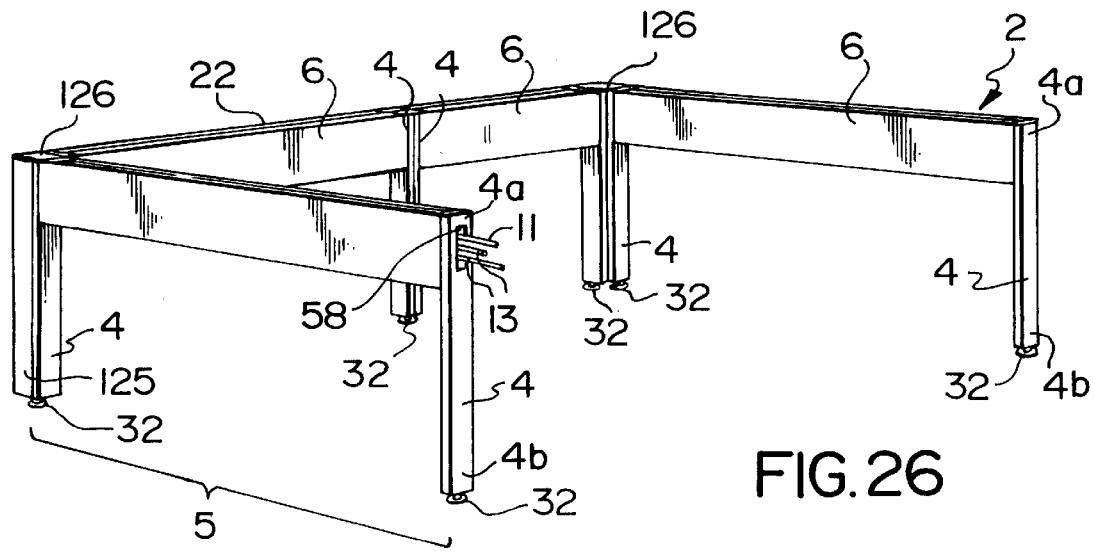
FIG. 26 is a perspective view of one possible arrangement of the frame members of the furniture frame system of the invention.

One can better appreciate the flexibility of the furniture frame system with reference to FIGS. 26 to 29. Referring to FIG. 26, there is illustrated a preferred configuration of the furniture frame system of this invention showing a lower frame 2a comprised of four units 5, 5, 5, 5. One unit 5 including a horizontal frame member 6 attached at either end to vertical frame members or legs 4, 4 in an abutting fashion at work surface height. Each leg having an adjustable foot 32 at its bottom end 4b. The units 5 can be arranged in any number of configurations as shown in FIGS. 3B to 3I and secured by suitable connecting means such as brackets 95 (shown in FIG. 4) and/or butterfly hinges 90 (shown in FIG. 3A). Suitable trim pieces such as post corner covers 125, corner cap 126, end panels 350 (not shown) and caps 356 (shown in FIGS. 28 and 29) are used to create aesthetically pleasing unit connections and conceal cable channels (not shown). Each horizontal 6 and vertical 4 frame member has at least one concealed channel (not shown) for power and/or signal cables (not shown). The horizontal 6 and vertical 4 frame members abut to provide a continuous channel (not shown) for the cables, the abutment selected from the group of abutments consisting of port to port; end to port; port to end; and end to end. The units 5 abut in a similar manner so that a continuous cable channel (not shown) runs through the furniture frame system 2a.

The furniture frame system of the invention can comprise an upper frame 26 for support of tack boards 28, privacy panels, overhead storage assembly 30, and the like as shown in FIG. 1. The upper frame comprises vertical frame members 304 having a concealed channel for the passage of cables (not shown) and abut the horizontal 6 and vertical 4, 304 frame member in such a manner as to provide a continuous cable channel (not shown) between frame members 6, 4, 304.

Figure 27:
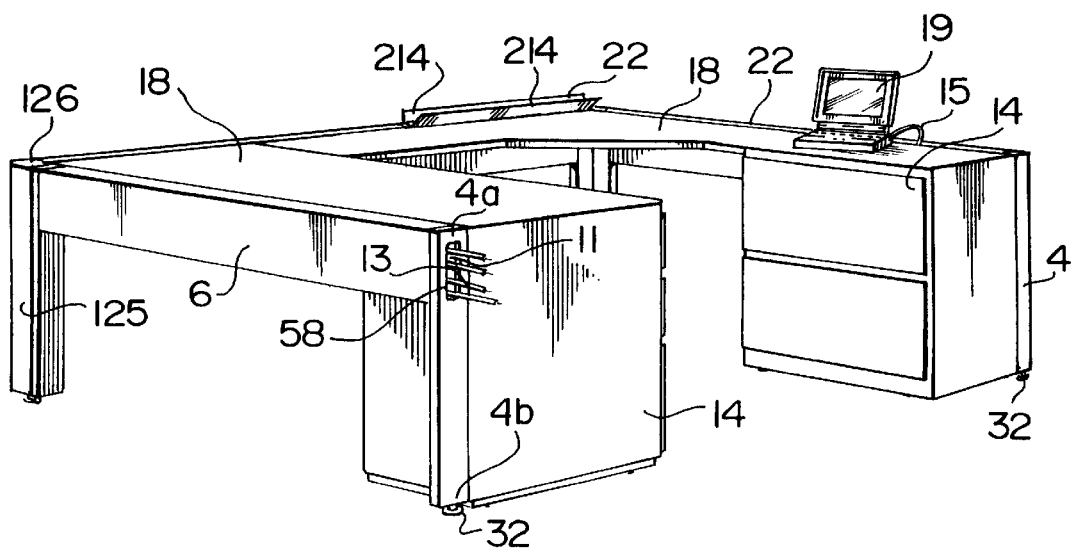
FIG. 27 is a perspective view illustrating work surface and lower cabinets attached to the arrangement of FIG. 26.

A person skilled in the art would recognize that the horizontal 6 and vertical 4, 304 frame members can be incorporated and used with conventional furniture components such as conventional horizontal and vertical frame members (not shown), if desired. For example, one can abut a horizontal frame member 6 with a vertical frame 4, 304 member to provide a continuous channel as described above, wherein the said horizontal frame member 6 is attached to a wall (not shown) or conventional leg (not shown) at the other end to keep it level. Furthermore, the furniture frame system can be associated with other furniture components without providing support for the components, for instance one unit 6 or horizontal frame member 6 can be placed adjacent to and flush with a work surface without supporting or interfering with the work surface of perhaps a conventional desk. Preferably, the vertical 4, 304 and horizontal 6 frame members are adapted to support furniture components such as a work surface 18, or cabinet 14 as shown in FIG. 27. The work surface as shown in FIG. 27, can be adapted to run the whole length or part of a horizontal frame member or where more than two horizontal frame members are used, a person skilled in the art would appreciate that. The work surface 18 can be of any length which can be supported by the frame system.

In addition to the accessories shown and described in association with the preferred embodiment described above, additional accessories may be desired by the user of the work space. Accordingly, privacy panels, shelves, lamps, privacy gables, white panels, paper trays, holders, and overhead storage with doors may be desired.

In addition to the above-described alternate embodiments, and the attachment of furniture components described, it will be seen that further alterations to the preferred embodiment of the frame system may be made within the scope of the invention. For example, horizontal frame member 6 is shown in the preferred embodiment in FIG. 1 connected to the legs 4, 4 at a end of the legs removed from the floor. It is intended that the horizontal frame member 6 may be connected at any point along the vertical frame member 4, 304, according to the needs of the installation.

Figure 29:
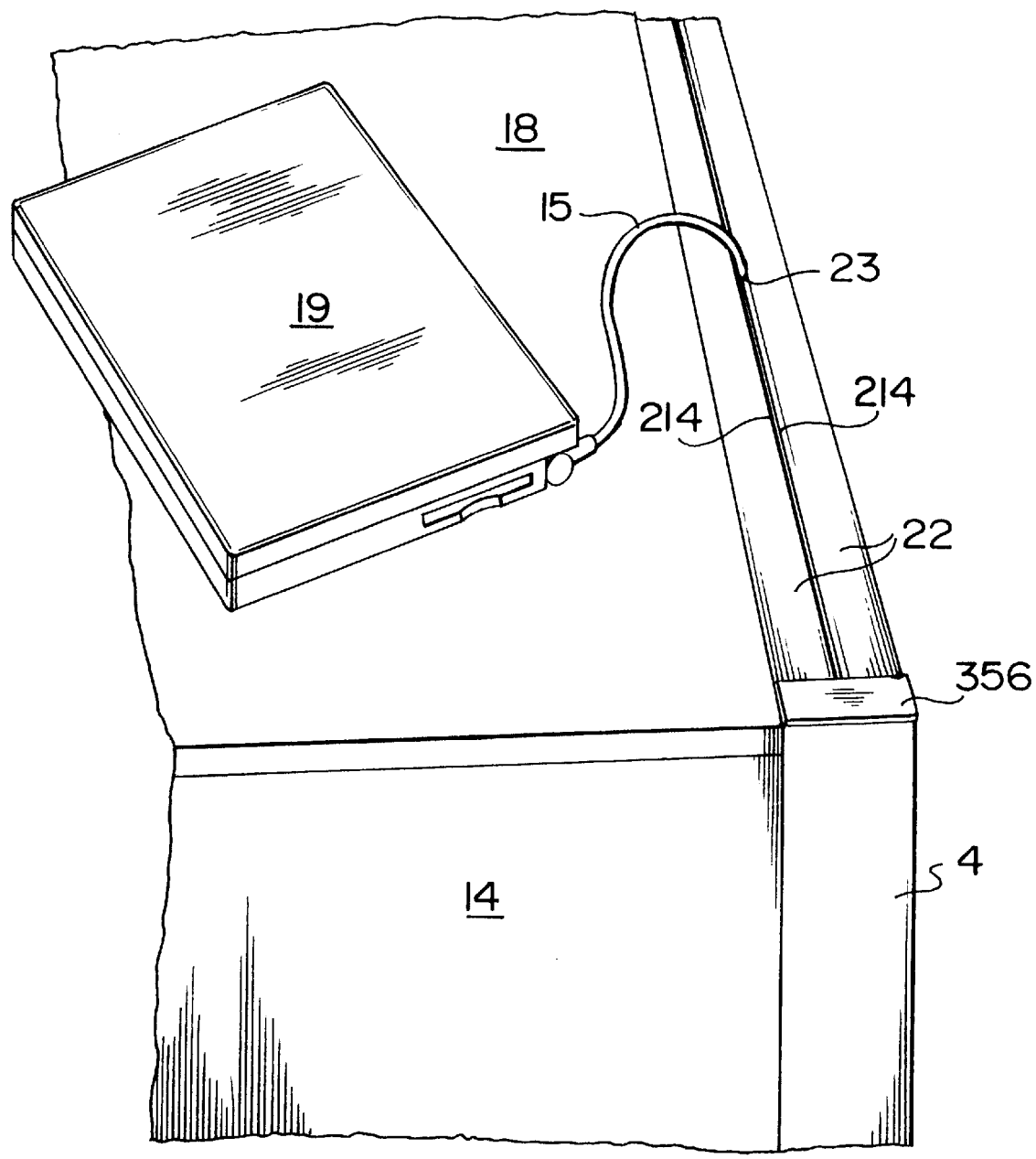
FIG. 29 is a close up view of FIG. 28 wherein the cover is closed.

Referring to FIG. 27, a lap top computer is connected to a signal and power cable outlet (not shown) in channel (not shown) of horizontal frame member 6. The cover 22 at the point of connection is closed, the cable 15 accessing the outlets through opening 23 between free edges 214 as shown in FIG. 29 allowing the lap top 19 to be repositioned on the work surface while remaining connected to the power and signal outlets (not shown) in the concealed channel. The repositioning of the computer 19 being limited only by the length of the cable 25. Alternatively the user can easily open the cover 22 from the top of the work surface 18, disconnect the cable 15 and reconnect the cable 15 to another outlet (not shown) located in the same or another horizontal frame member 6.

Figure 28:
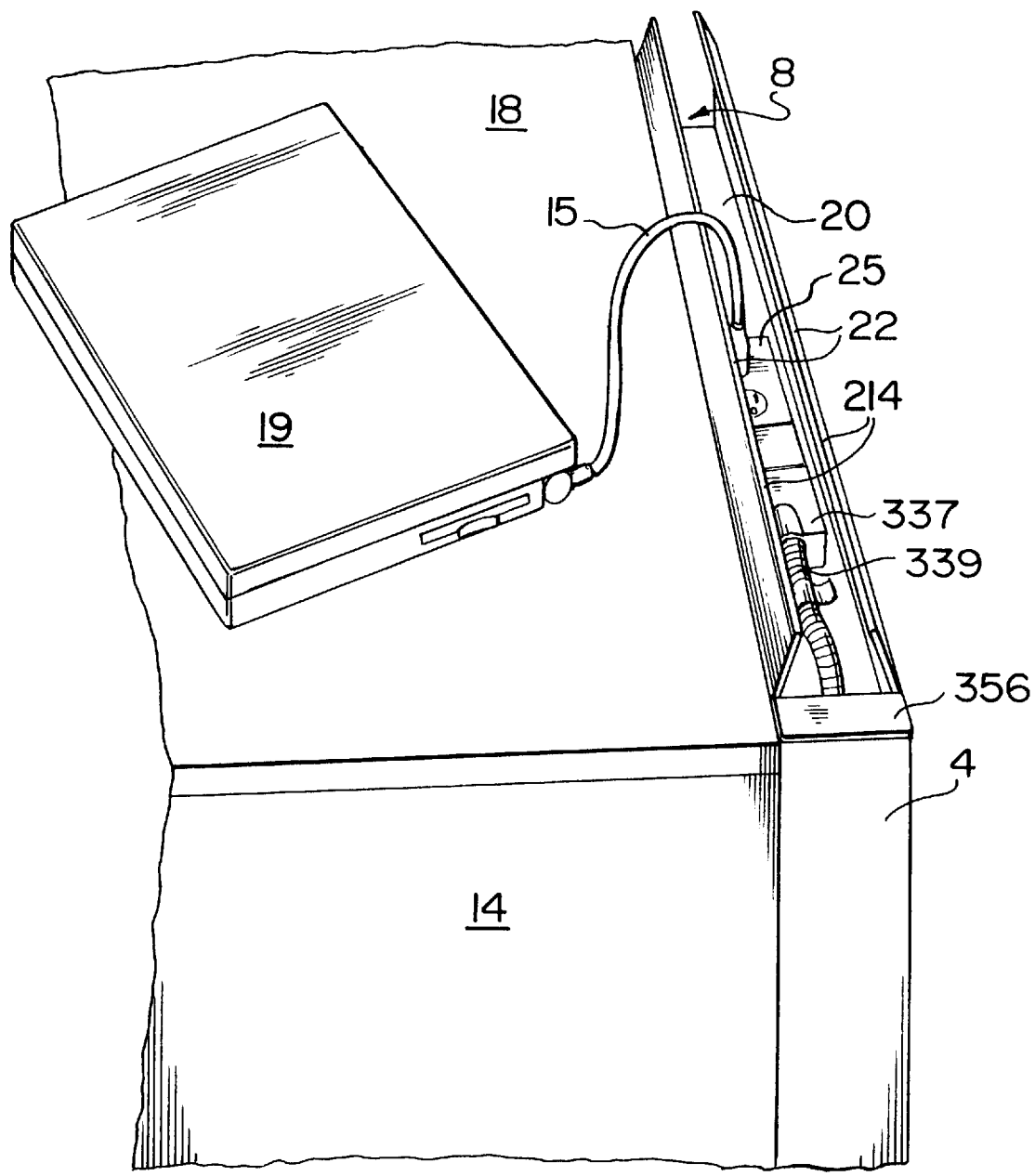
FIG. 28 is a close up view of a cable device on a work surface attached to an open channel of the horizontal frame member.

FIG. 28 shows the cable 15 of a lap top computer 19 positioned on work surface 18 connected to a power outlet 25 in channel 8 of a horizontal frame member 6. The channel can also contain signal cable outlets (not shown) for telephone and modem connections and the like. The cover 22 in FIG. 28 is only partially open. When open the cover 22 provides access to the power and signal cables located in channel 8 for easy maintenance, configuration or reconfiguration of the cables.

When closed, the cover 22 as shown in FIG. 29, conceals the channel 8 and the cable 15 can be dragged along opening 23 between free edges 214, permitting a cable device such as a lap top computer 19 to be repositioned on the work surface 18. Access cable can be stored in channel 8. In a preferred embodiment the cover 22 when closed is flush with the work surface 18.

It will be apparent from reading this description of preferred embodiments that many modifications or alterations may be made without departing from the spirit and scope of this invention as defined in the following claims.

We claim:

1. A furniture frame system for supporting a work surface comprising:
    (a) a horizontal frame member having first and second ends and top and bottom surfaces; and
    (b) a vertical frame member supporting the horizontal frame member at a work surface height having upper and lower ends,
    each frame member having a concealed cable channel extending throughout its entire length, the channel being defined by walls with ports for ingress and egress of cables, the frame members being shaped and constructed for mutual abutment to provide a continuous cable channel, the abutment being selected from the group of abutments consisting of: port to port; end to port, port to end; and end to end; and
    wherein the horizontal frame member has a central longitudinal opening in its top surface, the opening extending substantially the length of the horizontal frame member, said frame system being so constructed and arranged that the opening in the horizontal frame member is freely accessible when the work surface is supported by the frame system, and a cover for selectively closing the opening, the cover having a hinged longitudinal edge being rotatably moveable about said edge between an open position permitting access to an interior of said horizontal frame member along substantially an entire length of said horizontal frame member at work surface height, and a closed position wherein the horizontal frame member is substantially closed, the cover being moveable between the open and closed positions without the use of tools, the cover having at least one continuous flexible longitudinal free edge opposite said longitudinal hinged edge permitting cable to pass in and out of the opening and to freely move along the length of the cover with portions of said cable inside and outside of said horizontal frame member when said cover is in its closed position, and wherein the cable channel, the opening and the cover are so constructed and arranged to permit excess cable to be stored and concealed in the horizontal frame member.

2. The furniture frame system of claim 1 wherein the horizontal frame member comprises the concealed cable channel and a secondary cable channel which is detachably secured to the horizontal frame member by suitable attachment means, the concealed cable channel and the secondary cable channel being so constructed and arranged to permit access to the concealed cable channel through the opening when the cover is in its open position, the secondary cable channel further being so constructed and arranged to abut at least one vertical frame member in such a manner as to provide a continuous cable channel therethrough.

3. The furniture frame system of claim 2 wherein the horizontal frame member has an opening in its bottom surface extending along the length of the concealed cable channel, the opening defined by inwardly projecting walls and wherein the secondary cable channel is defined by a continuous wall forming an opening, and L-shaped flanges on opposite sides of the opening, the flanges engaging the inwardly projecting walls of the horizontal frame member, to hang the secondary cable channel below the horizontal frame member, the secondary channel being made of resilient material so that when pressure is applied to the sides of the secondary cable channel along the continuous wall, the flanges release and allow the secondary cable channel to be detached from the horizontal frame member to provide access to both the concealed cable channel and the secondary cable channel.

4. The furniture frame system of claim 1 wherein the top surface of the horizontal frame member is flush with the work surface.

5. The furniture frame system of claim 1 wherein the cover has a central longitudinal opening and comprises two parts, each part having a hinged edge and a flexible free edge, and, when the cover is closed, the free edges meet and allow a cable to pass freely therebetween and permit free movement of the cable along the length of the cover.

6. The furniture frame system of claim 1 wherein the vertical frame member contains at least one power and/or signal cable outlet, the outlets being positioned at a predetermined desired location.

7. The furniture frame system of claim 1 wherein the vertical frame member has an opening in an exterior surface extending substantially throughout its length and a means for covering the opening which is removable, the covering means, when removed, providing access to cable located in the channel of the vertical frame member, and, when closed, the covering means conceals the opening.

8. The furniture frame system of claim 1 wherein the horizontal and vertical frame members have means for securing and supporting one or more furniture components.

9. The furniture frame system of claim 8 wherein the one or more furniture components are selected from the group consisting of: a shelf, a privacy panel, a tack board, a privacy gable, a work surface, a cabinet, a drawer unit, an overhead storage unit, a lamp, an overhead lamp, a counter, a gable, a white board, a glazing unit, a holder, a tray, a cabinet and a support bar.

10. The furniture frame system of claim 8 wherein the securing and supporting means is such that an exterior wall of the horizontal frame member has a top support bracket hanger lip extending horizontally along the length of the horizontal frame member and a top support bracket tie down slot extending parallel to the hanger lip for attachment of a furniture component.

11. The furniture frame system of claim 8 wherein the vertical frame member has at least one attachment surface selected from a group of attachment surfaces consisting of: a groove member and a track member, for engaging with the means for securing and supporting one or more furniture components.

12. The furniture frame system of claim 1 further comprising three or more vertical frame members arranged to form a corner, and wherein a cable chase is arranged in the corner.

13. The furniture frame system of claim 1 comprising at least two vertical frame members connected end to end to form a continuous channel.

14. The furniture frame system of claim 1 comprising at least one frame unit, the frame unit comprising two spaced apart vertical frame members and one horizontal frame member wherein the horizontal frame member abuts each of the two vertical frame members at work surface height forming a continuous channel for the passage of cable.

15. The furniture frame system of claim 14 comprising at least two frame units and means for connecting the at least two frame units to form a continuous channel for the passage of cable between the frame units.

16. The furniture frame unit of claim 15 wherein the connecting means is a butterfly hinge.

17. The furniture frame system of claim 1 wherein the horizontal and vertical frame members have interior and exterior grooves, tracks and screw ports for attachment of a furniture component and/or another frame member.

18. The furniture frame system of claim 1 wherein the horizontal frame member has at least one power and/or signal outlet in its concealed cable channel.

19. A furniture frame system adapted for supporting a work surface comprising:
   (a) at least one horizontal frame member having a first and second end and a top and bottom surface; and
   (b) at least one vertical frame member having an upper end and a lower end,
   wherein each frame member has at least one concealed channel for cable and cable outlets extending throughout its entire length, the channel being defined by walls with ports for ingress and egress of cables, wherein at least one horizontal frame member abuts at least one vertical frame member at work surface height providing a continuous channel, the abutment being selected from the group of abutments consisting of: port to port; end to port, port to end: and end to end; and
   wherein the horizontal frame member has a central longitudinal opening in its top surface, the opening extending substantially the length of the horizontal frame member and a cover for the opening, which can be opened and closed without use of tools, the opening providing access at work surface height to substantially the entire horizontal frame member, the cover having at least one flexible edge thereby permitting cable to pass in and out of the opening when said cover is in its closed position and to freely move along the length of the cover when said cover is in its closed position, and excess cable can be stored and concealed in the horizontal frame member, and
   wherein the horizontal frame member has a main cable channel and an associated secondary cable channel, wherein the secondary cable channel is located below the main cable channel, and wherein the secondary cable channel is detachably secured to the main cable channel for rapid installation and deinstallation, the secondary channel abutting at least one vertical frame member in such a manner as to provide a continuous cable channel therethrough; and
   wherein the secondary cable channel can be detachably secured to, or removed from, the horizontal frame member by snap-in attachment means which mate with corresponding snap-in receiving means of the horizontal frame member.

20. A furniture frame system adapted for supporting a work surface comprising:
   (a) at least one horizontal frame member having a first and second end and a top and bottom surface; and
   (b) at least one vertical frame member having an upper end and a lower end,
   wherein each frame member has at least one concealed channel for cable and cable outlets extending throughout its entire length, the channel being defined by walls with ports for ingress and egress of cables, wherein at least one horizontal frame member abuts at least one vertical frame member at work surface height providing a continuous channel, the abutment being selected from the group of abutments consisting of: port to port end to port, port to end; and end to end; and
   wherein the horizontal frame member has a central longitudinal opening in its top surface, the opening extending substantially the length of the horizontal frame member and a cover for the opening, which can be opened and closed without use of tools, the opening providing access at work surface height to substantially the entire horizontal frame member, the cover having at least one flexible edge thereby permitting cable to pass in and out of the opening when said cover is in its closed position and to freely move alone the length of the cover when said cover is in its closed position, and excess cable can be stored and concealed in the horizontal frame member,
   wherein the horizontal and vertical frame members have attachment means for securing and supporting one or more furniture components; and
   wherein at least one vertical frame member is used in supporting a furniture component and the attachment is such that said member has at least one attachment surface selected from a groove or a track member provided in the frame member for receiving a furniture component; and
   wherein said vertical frame member is rectangular and has a U-shaped channel along its length for passage of power and/or signal cable, and the vertical frame member further comprises a T-shaped track means mounted on walls of said U-shaped channel for cooperating sliding engagement with arm members or groove members of elements for connecting one frame member to another frame member.

* * * * *